(12) United States Patent
Lee et al.

(10) Patent No.: US 10,652,701 B2
(45) Date of Patent: May 12, 2020

(54) METHOD AND APPARATUS OF TRANSMITTING A SPATIAL STREAM FOR MU-MIMO IN A WIRELESS LOCAL AREA NETWORK SYSTEM

(71) Applicant: LG ELECTRONICS INC., Seoul (KR)

(72) Inventors: Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 14/516,302

(22) Filed: Oct. 16, 2014

(65) Prior Publication Data
US 2015/0036674 A1    Feb. 5, 2015

Related U.S. Application Data

(63) Continuation of application No. 13/016,900, filed on Jan. 28, 2011, now Pat. No. 8,891,666.
(Continued)

(51) Int. Cl.
*H04W 4/08* (2009.01)
*H04B 7/04* (2017.01)
(Continued)

(52) U.S. Cl.
CPC ............ *H04W 4/08* (2013.01); *H04B 7/0452* (2013.01); *H04W 72/042* (2013.01);
(Continued)

(58) Field of Classification Search
CPC ........... H04W 72/042; H04W 72/1278; H04W 84/12; H04W 4/08; H04W 72/046; H04W 8/12; H04B 7/0452
See application file for complete search history.

(56) References Cited

U.S. PATENT DOCUMENTS 6,724,813 B1    4/2004 Jamal et al.
2006/0195576 A1    8/2006 Rinne et al.
(Continued)

FOREIGN PATENT DOCUMENTS

CN    101064544    10/2007
CN    101268660    9/2008
(Continued)

OTHER PUBLICATIONS

GroupID Concept for Downlink MU-MIMO Transmission Jan. 10, 2018 (Year: 2018).*
(Continued)

*Primary Examiner* — Charles C Jiang
*Assistant Examiner* — Voster Preval
(74) *Attorney, Agent, or Firm* — Lee Hong Degerman Kang Waimey

(57) ABSTRACT

A method of transmitting a spatial stream for multi user (MU)-multiple input multiple output (MIMO) in a wireless local area network system and a transmitter for performing the method are provided. The method includes transmitting, to a receiver, a management frame including group information to assign or change a position of a plurality of spatial streams corresponding to each of a plurality of groups, and transmitting, to the receiver, a frame including at least one spatial stream, wherein the group information includes a plurality of group indicators and a plurality of spatial stream (SS) indicators, each of the plurality of group indicators indicating whether the receiver is a member of each of the plurality of groups, each of the plurality of SS indicators indicating a position of the plurality of spatial streams corresponding to each of the plurality of groups.

6 Claims, 16 Drawing Sheets

Related U.S. Application Data

(60) Provisional application No. 61/299,353, filed on Jan. 29, 2010, provisional application No. 61/317,697, filed on Mar. 26, 2010, provisional application No. 61/327,716, filed on Apr. 25, 2010, provisional application No. 61/362,282, filed on Jul. 7, 2010.

(51) Int. Cl.
| | | |
|---|---|---|
| *H04W 84/12* | (2009.01) | |
| *H04B 7/0452* | (2017.01) | |
| *H04W 72/04* | (2009.01) | |
| *H04W 72/12* | (2009.01) | |

(52) U.S. Cl.
CPC ....... *H04W 72/1278* (2013.01); *H04W 84/12* (2013.01); *H04W 72/046* (2013.01)

(56) References Cited

U.S. PATENT DOCUMENTS

| | | | |
|---|---|---|---|
| 2008/0212701 A1 | 9/2008 | Pan et al. | |
| 2010/0046492 A1 | 2/2010 | Abraham et al. | |
| 2010/0309834 A1* | 12/2010 | Fischer | H04B 7/0452 370/312 |
| 2011/0002219 A1* | 1/2011 | Kim | H04B 7/0417 370/203 |
| 2011/0032875 A1* | 2/2011 | Erceg | H04B 7/0452 370/328 |
| 2011/0103280 A1* | 5/2011 | Liu | H04W 52/0229 370/311 |
| 2011/0110454 A1* | 5/2011 | Sampath | H04L 1/02 375/295 |
| 2011/0249660 A1 | 10/2011 | Noh et al. | |
| 2012/0106531 A1 | 5/2012 | Seok et al. | |
| 2012/0218982 A1 | 8/2012 | Lee et al. | |
| 2012/0230242 A1* | 9/2012 | Kim | H04B 7/0452 370/312 |
| 2012/0269183 A1 | 10/2012 | Sohn et al. | |
| 2012/0281774 A1 | 11/2012 | Lee et al. | |
| 2012/0327915 A1 | 12/2012 | Kang et al. | |
| 2013/0010664 A1 | 1/2013 | Kang et al. | |
| 2013/0208715 A1 | 8/2013 | Roh et al. | |

FOREIGN PATENT DOCUMENTS

| | | | |
|---|---|---|---|
| CN | 101395855 | 3/2009 | |
| EP | 1821477 | 8/2007 | |
| JP | 2007214856 | 8/2007 | |
| JP | 2007259217 | 10/2007 | |
| RU | 2238611 | 10/2004 | |
| RU | 2367097 | 9/2009 | |
| WO | 11/065743 | 6/2011 | |
| WO | 2011/093668 | 8/2011 | |
| WO | WO 2011065743 A3 * | 10/2011 | ........... H04B 7/0452 |
| WO | WO2011065743 A3 * | 10/2011 | |
| WO | WO-2011065743 A3 * | 10/2011 | ........... H04B 7/0452 |

OTHER PUBLICATIONS

Kim, et al., "GroupID Concept for Downlink MU-MIMO Transmission," doc. IEEE 802.11-10/0073r0, Jan. 2010, 8 pages.

Japan Patent Office Application Serial No. 2012-551089, Notice of Allowance dated Oct. 30, 2014, 3 pages.

Kim, et al., "GroupID Concept for Downlink MU-MIMO Transmission," IEEE 802.11-10/0073r0, Jan. 2010, 8 pages.

Kim, et al., "GroupID Concept for Downlink MU-MIMO Transmission," IEEE 802.11-10/0073r1, Jan. 2010, 8 pages.

Korean Intellectual Property Office Application Serial No. 10-2012-7019263, Office Action dated Jul. 30, 2013, 4 pages.

Kim, et al., "GroupID Concept for Downlink MU-MIMO Transmission," doc.: IEEE 802.11-10/0073r1, Jan. 2010, 8 pages.

The State Intellectual Property Office of the People's Republic of China Application Serial No. 201180011396.4, Office Action dated Jun. 30, 2014, 7 pages.

IP Australia Application Serial No. 2011210100, Office Action dated Jun. 17, 2014, 4 pages.

Kim, et al., "GroupID Concept for Downlink MU-MIMO transmssion,"doc: IEEE 802.11-10/0073r1. XP0176777563, Jan. 2010, 8 pages.

Stacey, et al., "Proposed Specification Framework edits for preamble structure and A-MMDU," doc: IEEE 802.11-09/0992r3, XP002652702, Jan. 2010, 8 pages.

European Patent Office Application Serial No. 11737307.6, Search Report dated May 26, 2014, 7 pages.

Japan Patent Office Application Serial No. 2012-551089, Office Action dated Dec. 12, 2013, 2 pages.

Russian Federarion Federal Service for Intellectual Property, Patents and Trademarks Application Serial No. 2012136820/07, Notice of Allowance dated Feb. 6, 2014, 7 pages.

IP Australia Application Serial No. 2011210100, Office Action dated Sep. 5, 2013, 4 pages.

\* cited by examiner

FIG. 5

| MU-MIMO Group ID #x | Association ID for STA #$S_0$ | Association ID for STA #$S_1$ | Association ID for STA #$S_2$ | ... | Association ID for STA #$S_{N-1}$ |

FIG. 6

| Management Information for STA #x | MU-MIMO Group ID | Spatial Stream Association ID | MU-MIMO Group ID | Spatial Stream Association ID | ... |

FIG. 10

| MU-MIMO Group ID | Spatial Stream Association ID | Association ID for STA #1 | Association ID for STA #2 | Association ID for STA #3 | ... | Association ID for STA #N |
|---|---|---|---|---|---|---|

FIG. 14

| MU-MIMO Group ID | MU-MIMO Group Set ID | Association ID for STA #a | Association ID for STA #b | ... | Association ID for STA #c |

Management Information for multiple STAs

METHOD AND APPARATUS OF TRANSMITTING A SPATIAL STREAM FOR MU-MIMO IN A WIRELESS LOCAL AREA NETWORK SYSTEM

CROSS-REFERENCE TO RELATED APPLICATIONS

This application is a continuation of U.S. patent application Ser. No. 13/016,900, filed on Jan. 28, 2011, now U.S. Pat. No. 8,891,666, which claims the benefit of U.S. Provisional Application No. 61/299,353, filed on Jan. 29, 2010, 61/317,697, filed on Mar. 26, 2010, 61/327,716 filed on Apr. 25, 2010, and 61/362,282, filed on Jul. 7, 2010, the contents of all of which are hereby incorporated by reference herein in their entireties.

BACKGROUND OF THE INVENTION

Field of the Invention

The present invention relates to wireless communication, and more particularly, to a method and apparatus of transmitting a spatial stream for MU-MIMO in a wireless local area network system.

Related Art

With the recent development of information communication technology, a variety of wireless communication techniques are being developed. From among them, a WLAN is a technique which enables wireless access to the Internet at home or companies or in a specific service providing area using mobile terminals, such as a Personal Digital Assistant (PDA), a laptop computer, and a Portable Multimedia Player (PMP), on the basis of radio frequency technology.

Since Institute of Electrical and Electronics Engineers (IEEE) 802 (i.e., the standard organization of WLAN technology) has been set up on February, 1980, lots of standardization tasks are being performed.

The initial WLAN technology was able to support the bit rate of 1 to 2 Mbps through frequency hopping, band spreading, and infrared communication using a 2.4 GHz frequency band in accordance with IEEE 802.11, but the recent WLAN technology can support the maximum bit rate of 54 Mbps using Orthogonal Frequency Division Multiplex (OFDM). In addition, in the IEEE 802.11, the standardization of various techniques, such as the improvements of Quality of Service (QoS), the compatibility of Access Point (AP) protocols, security enhancement, radio resource measurement, wireless access vehicular environment for vehicle environments, fast roaming, a mesh network, interworking with an external network, and wireless network management, is put to practical use or being developed.

IEEE 802.11b of the IEEE 802.11 supports a maximum transmission speed of 11 Mbs while using the 2.4 GHz frequency band. IEEE 802.11a commercialized after the IEEE 802.11b has reduced the influence of interference as compared with the very complicated 2.4 GHz frequency band by using a 5 GHz frequency band not the 2.4 GHz frequency band and also improved the transmission speed up to a maximum of 54 Mbps using the OFDM technique. However, the IEEE 802.11a is disadvantageous in that the communication distance is shorter than that of the IEEE 802.11b. Further, IEEE 802.11g implements a maximum communication speed of 54 Mbps using the 2.4 GHz frequency band like the IEEE 802.11b and satisfies backward compatibility. The IEEE 802.11g is being in the spotlight and superior to the IEEE 802.11a even in the communication distance.

Further, as a technique for overcoming limits to the communication speed pointed out as vulnerabilities in the WLAN, there is IEEE 802.11n which has recently been standardized. The IEEE 802.11n has its object to increase the speed and reliability of a network and to expand the operating distance of a wireless network. More particularly, the IEEE 802.11n is based on a Multiple Inputs and Multiple Outputs (MIMO) technique using multiple antennas on both sides of a transmitter and a receiver in order to support a High Throughput (HT) having a data processing speed of 540 Mbps or higher, minimize transmission error, and optimize the data rate. Further, the IEEE 802.11n may use not only a coding method of transmitting several redundant copies in order to increase data reliability, but also an OFDM (Orthogonal Frequency Division Multiplex) method in order to increase the data rate.

With the WLAN being widely spread and applications using the WLAN becoming diverse, a need for a new WLAN system capable of supporting a higher throughput than the data processing speed supported by the IEEE 802.11n is recently gathering strength. A Very High Throughput (VHT) WLAN system is one of IEEE 802.11 WLAN systems which have recently been proposed in order to support a data processing speed of 1 Gbps or higher. The name 'VHT WLAN system' is arbitrary. A feasibility test for a system using 8×8 MIMO and a channel bandwidth of 80 MHz or higher so as to provide the throughput of 1 Gbps or higher is in progress.

When implemented is a method for transmitting data to multiple STAs belonging to 802.11ac VHT WLAN system supporting the MU-MIMO transmission, the STAs must be informed through the VHT-SIG part of PLCP preamble that which STA receives data through which spatial stream. However, the association ID intended for identifying each individual STA requires a considerable number of bits; accordingly, a large amount of bits are required to inform the multiple STAs of spatial stream information. Therefore, one should take account of a method for reducing the number of bits carried by the PLCP preamble and informing STAs of the number of spatial streams.

SUMMARY OF THE INVENTION

The present invention provides a method and apparatus of transmitting a spatial stream for MU-MIMO in a wireless local area network system.

In an aspect, a method of transmitting a spatial stream for multi user (MU)-multiple input multiple output (MIMO) in a wireless local area network system, performed by a transmitter, comprises transmitting, to a receiver, a management frame including group information to assign or change a position of a spatial stream corresponding to each of a plurality of groups, and transmitting, to the receiver, a frame including at least one spatial stream, wherein the group information includes a plurality of group indicators and a plurality of spatial stream (SS) indicators, each of the plurality of group indicators indicating whether or not the receiver is a member of each of the plurality of groups, each of the plurality of SS indicators indicating a position of a spatial stream corresponding to each of the plurality of groups.

The frame further may include a header including a group identity field indicating a membership group of the plurality of groups, wherein the receiver is a member of the membership group.

If the group identity field is set to a predefined value, the frame may be transmitted by using single user (SU)-MIMO.

The header further may include a long training field used to estimate channel for decoding the at least one spatial stream.

Each of the plurality of SS indicators may indicate the position of the spatial stream within four spatial streams.

The transmitter may be an access point (AP).

The position of the spatial stream corresponding to each of the plurality of groups may be associated with one or more receivers.

In another aspect, a transmitter for MU-MIMO in a wireless local area network system comprises a processor and a radio frequency (RF) unit operatively coupled to the processor and configured to transmit a frame, wherein the processor is configured to transmit, to a receiver, a management frame including group information to assign or change a position of a spatial stream corresponding to each of a plurality of groups and transmitting, to the receiver, a frame including at least one spatial stream, wherein the group information includes a plurality of group indicators and a plurality of SS indicators, each of the plurality of group indicators indicating whether or not the receiver is a member of each of the plurality of groups, each of the plurality of SS indicators indicating a position of a spatial stream corresponding to each of the plurality of groups.

The frame may further include a header including a group identity field indicating a membership group of the plurality of groups, wherein the receiver is a member of the membership group.

If the group identity field is set to a predefined value, the frame may be transmitted by using SU-MIMO.

The header may further include a long training field used to estimate channel for decoding the at least one spatial stream.

Each of the plurality of SS indicators may indicate the position of the spatial stream within four spatial streams.

In still another aspect, a method of receiving a spatial stream for MU-MIMO in a wireless local area network system, performed by a receiver, comprises receiving, from a transmitter, a management frame including group information to assign or change a position of a spatial stream corresponding to each of a plurality of groups, receiving, from the transmitter, a header in a frame, identifying a membership group based on the header, and if the receiver is a member of the membership group, receiving, from the receiver, at least one spatial stream in the frame, wherein the group information includes a plurality of group indicators and a plurality of SS indicators, each of the plurality of group indicators indicating whether or not the receiver is a member of each of the plurality of groups, each of the plurality of SS indicators indicating a position of a spatial stream corresponding to each of the plurality of groups, wherein the header includes a group identity field indicating the membership group of the plurality of groups.

BRIEF DESCRIPTION OF THE DRAWINGS

FIG. 5 is one example of indicating that the value of GGIF and particular STAs are associated logically with each other in the management frame.

FIGS. 6 to 10 illustrate one example of a method for providing STAs with group ID indication information and position indication information of the STAs through the management frame.

FIG. 14 illustrates a format of the management information included in the management frame according to an embodiment of the present invention.

DESCRIPTION OF EXEMPLARY EMBODIMENTS

Hereinafter, some embodiments of the present invention are described in detail with reference to the accompanying drawings. The following embodiments can be usefully applied to a Very High Throughput (VHT) WLAN system using a channel bandwidth of 80 MHz, but not limited thereto. For example, the embodiments of the present invention can also be applied to a WLAN system using a channel bandwidth, exceeding 40 MHz or 80 MHz and including a plurality of channel blocks.

Figure 1:
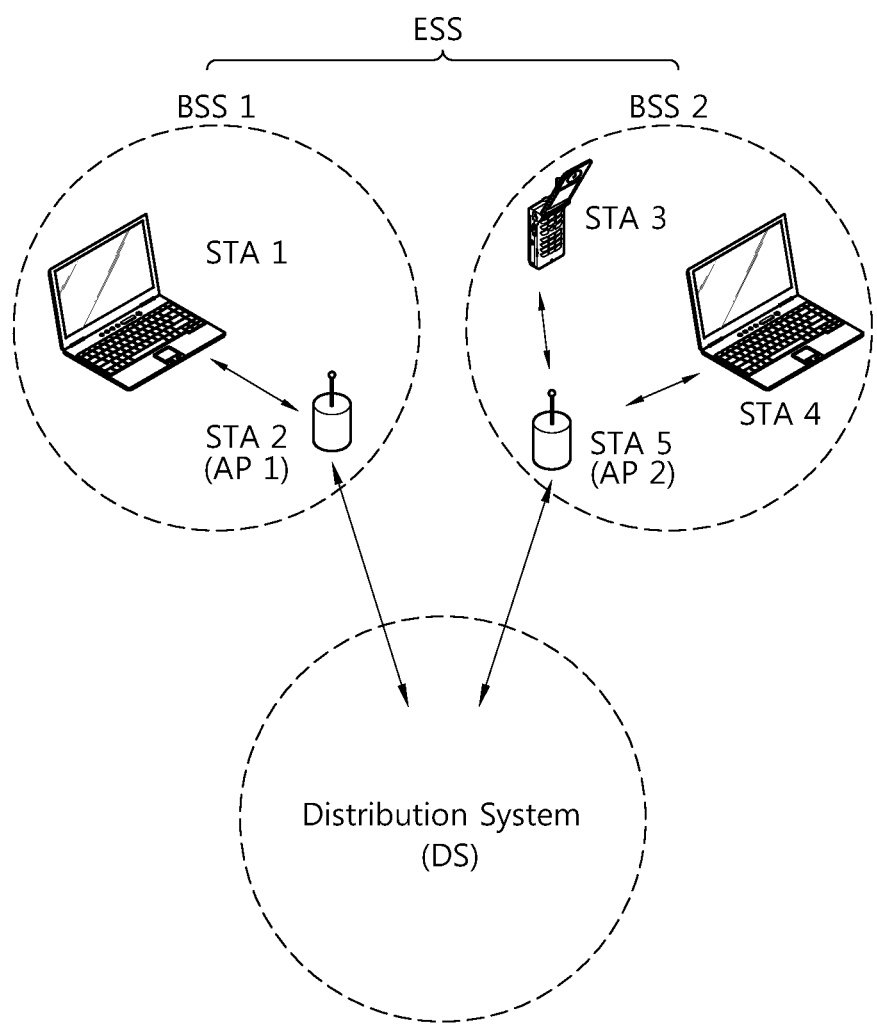
FIG. 1 is a diagram showing an example of a WLAN system.

FIG. 1 is a diagram showing an example of a WLAN system to which an embodiment of the present invention can be applied. The WLAN system according to the example of FIG. 1 is a Very High Throughput (VHT) WLAN system.

Referring to FIG. 1, the WLAN system, such as a VHT WLAN system, includes one or more Basic Service Sets (hereinafter referred to as a 'BSS'). The BSS is a set of STAtions (hereinafter referred to as an 'STA') which can communicate with each other through successful synchronization. The BSS is not a concept indicating a specific area. Further, as in a WLAN system to which an embodiment of the present invention can be applied, a BSS supporting ultra-high data processing of 1 GHz or higher at the MAC Service Access Point (SAP) is referred to as a VHT BSS.

The VHT BSS can be classified into an infrastructure BSS and an Independent BSS (hereinafter referred to as an 'IBSS'). An infrastructure BSS is shown in FIG. 1. The infrastructure BSS BSS1 and BSS2 includes one or more Non-AP STAs STA 1, STA 3, and STA 4, Access Points AP 1 (STA 2) and AP 2 (STA 5) providing distribution service, and a Distribution System (hereinafter referred to as a 'DS')

interconnecting the plurality of APs AP 1 and AP 2. In the infrastructure BSS, an AP STA manages the Non-AP STAs of the BSS.

On the other hand, the IBSS (i.e., the independent BSS) is a BSS operating in the ad-hoc mode. The IBSS does not include a centralized management entity, performing a management function at the center, because it does not include an AP VHT STA. That is, in the IBSS, Non-AP STAs are managed in a distributed manner. Further, in the IBSS, all STAs can be composed of mobile STAs, and they form a self-contained network because access to a DS is not permitted.

An STA includes both an AP (i.e., in a broad sense) and a Non-AP STA which are certain function media, including a Medium Access Control (MAC) layer and a physical layer interface for a radio medium in accordance with the IEEE 802.11 standard. Further, in a multi-channel environment to be described later, an STA supporting ultra-high data processing of 1 GHz or higher is referred to as a VHT STA. In a VHT WLAN system to which an embodiment of the present invention can be applied, all STAs included in the above BSS can be VHT STAs, or VHT STAs and legacy STAs (e.g., HT STAs in accordance with the IEEE 802.11n standard) can coexist in the STAs included in the above BSS.

An STA for wireless communication includes a processor and a transceiver and further includes a user interface, display means, etc. The processor is a function unit configured to generate a frame which will be transmitted over a wireless network or to process a frame received over the wireless network. The processor performs various functions for controlling the STA. Further, the transceiver is functionally connected to the processor and configured to transmit and receive a frame over the wireless network for the STA.

A portable terminal used by a user, from among STAs, corresponds to a Non-AP STA (e.g., STA1, STA3 and STA4). If an STA can be simply referred as a Non-AP STA. The Non-AP STA may also be referred to as another terminology, such as a terminal, a Wireless Transmit/Receive Unit (WTRU), a User Equipment (UE), a Mobile Station (MS), a mobile terminal, or a mobile subscriber unit. Further, in a multi-channel environment to be described later, a Non-AP STA supporting ultra-high data processing of 1 GHz or higher is referred to as a Non-AP VHT STA or simply a VHT STA.

Further, the APs AP1 and AP2 are function entities providing access to the DS via a radio medium for STAs (i.e., association STAs) associated therewith. In an infrastructure BSS including an AP, communication between Non-AP STAs is performed via the AP in principle. In case where a direct link is set up, communication can be directly performed between Non-AP STAs. The AP may also be referred to as a concentrated controller, a Base Station (BS), a node-B, a Base Transceiver System (BTS), or a site controller. Further, in a multi-channel environment to be described later, an AP supporting ultra-high data processing of 1 GHz or higher is referred to as a VHT AP.

A plurality of infrastructure BSSs can be interconnected through a DS (Distribution System). The plurality of BSSs interconnected through the DS is called an Extended Service Set (ESS). STAs included in the ESS can communicate with each other. Non-AP STAs can continue to communicate with each other within the same ESS and move from one BSS to another BSS.

The DS is a mechanism for enabling one AP to communicate with another AP. According to the mechanism, an AP can transmit a frame to STAs which are managed by the AP and connected to a BSS, can transfer a frame to any one STA in case where the STA has moved to another BSS, or can transfer a frame over an external network, such as a wired network. The DS needs not to be necessarily a network, and it can have any type as long as it can provide predetermined distribution service regulated in the IEEE 802.11 standard. For example, the DS may be a wireless network, such as a mesh network, or a physical structure for interconnecting APs.

Figure 2:
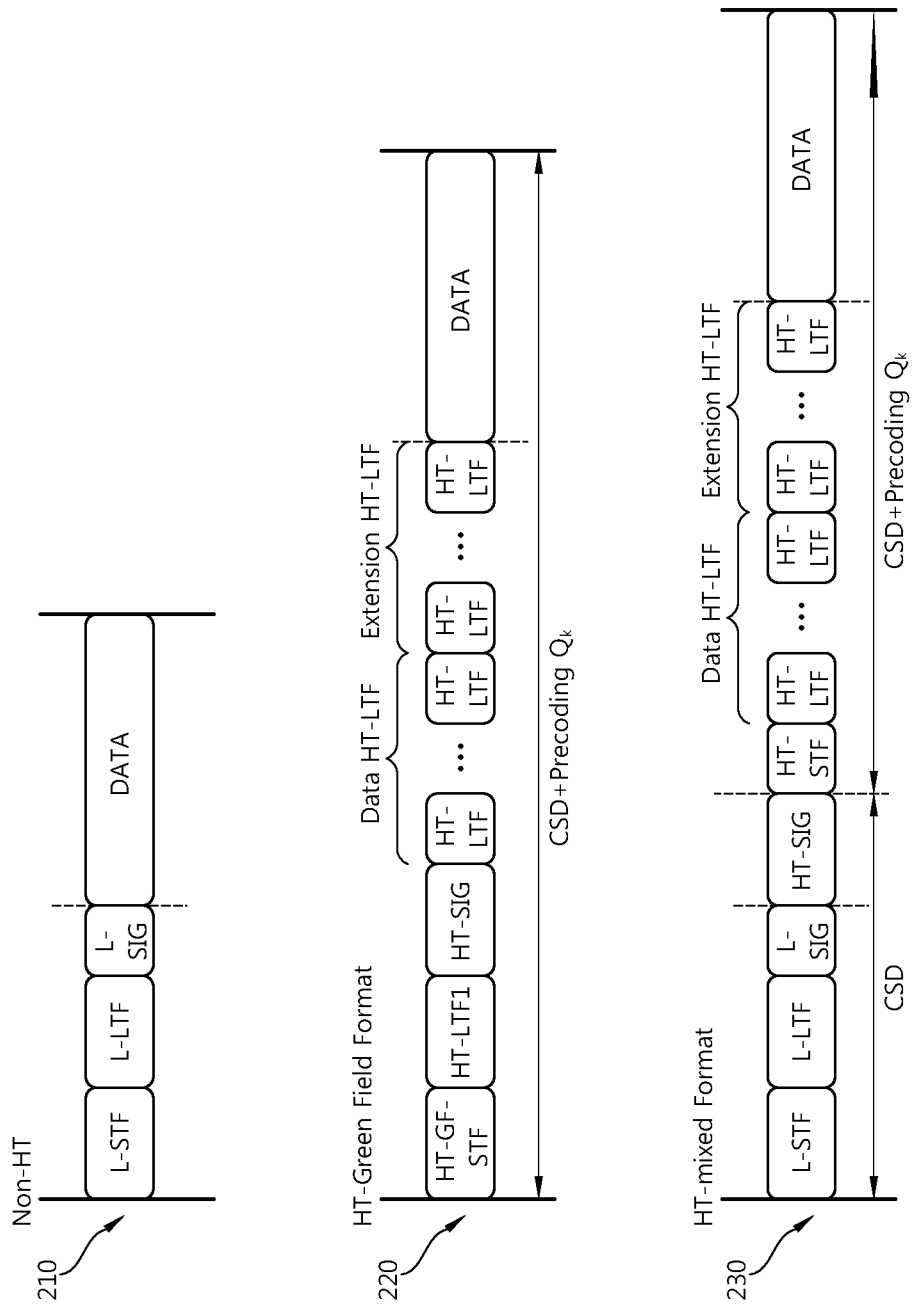
FIG. 2 is one example of a PLCP frame format supporting the IEEE 802.11n.

FIG. 2 is one example of a PLCP frame format supporting the IEEE 802.11n.

The IEEE 802.11n High Throughput (hereinafter, it is called an HT system) specifications support the PLCP format that supports the legacy 802.11a, 802.11b, and 802.11g. The PLCP format 210 supporting legacy STAs (Non-HT STAs) is transmitted in the order of legacy short training field (L-STF), legacy long training field (L-LTF), legacy signal (L-SIG), and data. L-STF is used for frame timing acquisition and automatic gain control convergence, while L-LTF for carrying out channel estimation to demodulate the L-SIG and the data. The L-SIG contains the information for demodulating and decoding the data subsequent to the PLCP.

Meanwhile, a system consisting of HT STAs only makes use of HT-Green Field format 220, a PLCP format optimized for the HT STA. The HT-Green Field PLCP format 220 is transmitted in the order of HT green field short training field (HT-GF-STF), HT long training field (HT-LTF), HT signal (HT-SIG), and data. The HT-GF-STF is used for frame timing acquisition and automatic gain control convergence, while the HT-LTF for carrying out channel estimation to demodulate the HT-SIG and the data. The HT-SIG contains the information for demodulating and decoding the data subsequent to the PLCP.

In addition, a system where legacy stations (Non-HT STA) and HT STAs co-exist supports an HT-mixed format 230, a PLCP format designed to support HT. In the HT-mixed format 230, L-STF, L-LTF, and L-SIG are first transmitted to allow Non-HT STAs to recognize the format. Next, transmitted is the HT signal (HT-SIG) transmitting information necessary for demodulating and decoding the data transmitted to an HT STA. Field data up to the HT-SIG are transmitted without using a beam-forming technique in order for various STAs including legacy systems to receive information, while transmission of the HT-LTF and the data to be transmitted after the HT-SIG is carried out by applying signal transmission through precoding. At this time, by taking account of the power variation due to the precoding at the STAs which receive the precoded signal, HT short training field (HT-STF) is transmitted, after which the HT-LTFs and the data are transmitted.

To utilize given channels efficiently in an IEEE 802.11 system, it is required that using of MU-MIMO type transmission by scheduling a plurality of STAs simultaneously. MU-MIMO is a technique where multiple STAs, each with potentially multiple antennas, transmit and/or receive independent data streams simultaneously. To support the MU-MIMO, the corresponding STAs should be informed of the fact that the data are transmitted through a particular spatial stream and subsequently, the corresponding STAs should be prepared to receive actual data according to the spatial stream.

Figure 3:
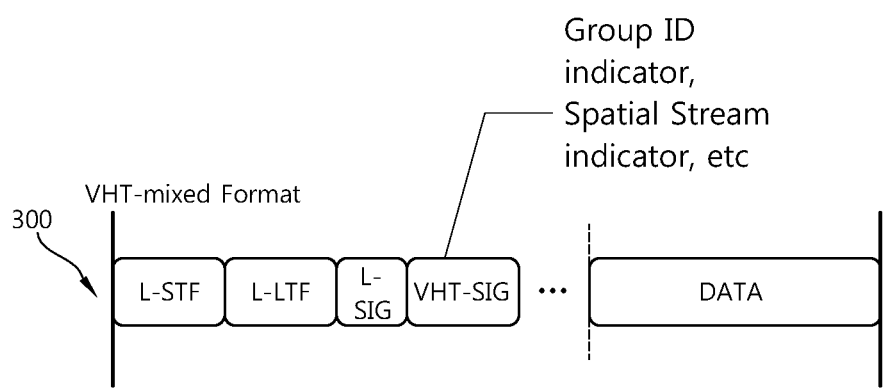
FIG. 3 is a block diagram illustrating one example of a PLCP frame format according to an embodiment of the present invention.

FIG. 3 is a block diagram illustrating one example of a PLCP frame format according to an embodiment of the present invention.

The VHT-mixed format 300 of FIG. 3 is basically the same as the HT-mixed format 230 of FIG. 2. In other words, L-STF, L-LTF, and L-SIG are first transmitted to allow Non-HT STAs to recognize the PLCP frame. Afterwards, VHT-SIG field containing control information for VHT STAs is transmitted.

According to an embodiment of the present invention, the VHT-SIG field includes a group ID indicator and a spatial stream (SS) indicator as control information. The VHT-SIG field may be transmitted while being divided into VHT-SIG-A containing common information about all the VHT STAs and VHT-SIG-B containing control information for separate VHT STAs. At this time, during the MU-MIMO transmission, the group ID indicator and the spatial stream (SS) indicator may be included in the VHT-SIG-A.

It is necessary for a transmitter attempting the MU-MIMO transmission to inform a plurality of receivers of particular spatial streams to receive. In other words, it is required for the transmitter to indicate through which spatial stream (SS) data are transmitted to each receiver, thereby preparing the receiver to receive the corresponding SS. At this time, the transmitter can be an AP, while the plurality of receivers can be the target STAs of DL MU-MIMO transmission. The target STAs of DL MU-MIMO transmission can be expressed by MU-MIMO paired STAs, recipients of MU-MIMO transmission, and the like. In what follows, for the convenience of description, it is assumed that DL MU-MIMO transmission is performed, where the AP transmits data to multiple STAs through MU-MIMO transmission.

In the VHT-SIG-A contained in the PLCP header of a PPDU (PLCP protocol data unit) transmitted through MU-MIMO transmission, a Group ID field can be included. The Group ID field indicates the recipients of the PPDU. The AP can transmit a management frame before sending MU-MIMO data packets through the MU-MIMO transmission. The management frame is a frame transmitted to assign or change positions of the STAs corresponding to the respective groups to which the target STAs belong.

The management frame can include group definition information. The group definition information includes information indicating one or more groups to which each individual STA belongs for the STAs that can be the potential recipients of MU-MIMO transmission and the position information of plurality of spatial streams assigned to the STA corresponding to each individual group. At this time, the position information of the spatial streams can be regarded as the information of a spatial stream set assigned to an STA when the STA receives MU-MIMO data packets as a member of a particular group. Wherein a spatial stream set contains plurality of spatial streams. The position information of a spatial stream set may be regarded as indication information of the spatial stream. In view of an STA, if the STA has multiple group IDs, in other words, the STA becomes a member of multiple groups, the position information of a spatial stream set corresponds to the information indicating a spatial stream set assigned to the STA in the individual group to which the STA can belong. The corresponding STA can identify the spatial stream set through which the data for the STA are transmitted by utilizing the position information while receiving MU-MIMO data packets transmitted to the group to which the STA belongs.

To be more specific, the group definition information may include information indicating a group to which each individual STA belongs and a group to which the STA does not belong. In the group definition information, how the AP informs of the group information related to STAs can be either directly informing each individual STA of the corresponding group to which the STA belongs or informing each individual group of which STA belongs to the group. The group definition information can further include the information indicating the position of the spatial stream for a particular STA among the total spatial streams transmitted through the MU-MIMO transmission.

In other words, the management frame includes the information indicating which STA belongs to which group and the information indicating the position of a spatial stream in the MU-MIMO transmission corresponding to each group. The management frame may be transmitted for each individual STA. Each individual STA gets to know which group it belongs to by receiving the management frame and the position of a spatial stream assigned to itself in the group. When an STA receives MU-MIMO data packets, it checks whether the data packets are those transmitted to the group to which it belongs through the group ID field included in the VHT SIG of the MU-MIMO data packet. If it is found that the data packets are intended for the group to which the STA belongs, the STA can then determine the data stream transmitted to itself through the position information in the corresponding group. In other words, the spatial stream set in question through which the data directed to the STA are transmitted is determined based on the group ID and the position of the STA in the group indicated by the group ID and the STA can choose the spatial stream that is supposed to be received by the STA.

Figure 4:
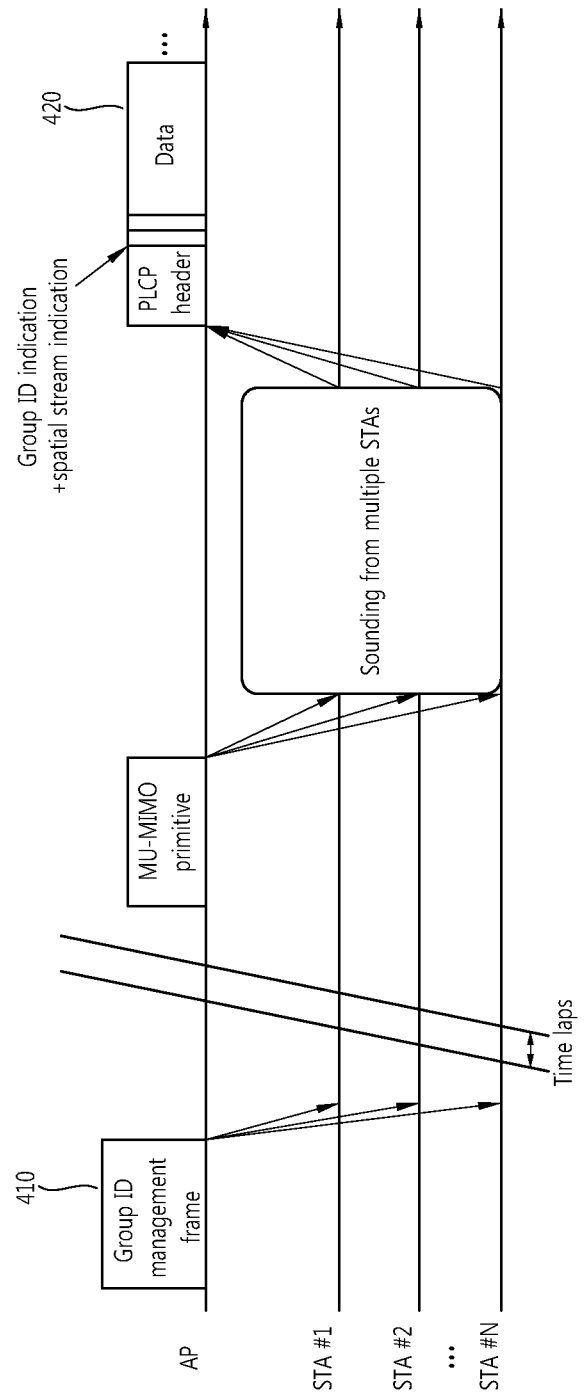
FIG. 4 illustrates a procedure for transmitting and receiving frames according to the embodiment of the present invention.

FIG. 4 illustrates a procedure for transmitting and receiving frames according to the embodiment of the present invention.

The example of FIG. 4 illustrates a case where the AP, as a transmitter, transmits data packets 420 to STA #1 to STA # N. The AP transmits a Group ID management frame 410 before sending data packets 420 to STA #1 to STA # N. As described above, the Group ID management frame 410 includes group indication information and spatial stream indication information. The Group ID management frame 410 can be transmitted to each individual STA through unicast transmission.

After transmission of the Group ID management frame 410, the AP can transmit MU-MIMO data packets. The AP, to carry out MU-MIMO transmission, can perform MU-MIMO primitive transmission notifying the MU-MIMO transmission and a sounding procedure for channel estimation.

The PLCP header of the MU-MIMO data packet 420 can include the Group ID indication information and the spatial stream indication information. Each of STA #1 to STA # N reads the Group ID indication information included in the PLCP header of the data packet 420 and checks whether the data packet is transmitted to itself; if the data packet is found to be directed to the group to which the STA belongs, the STA, according to the spatial stream indication information assigned to itself from the corresponding group, can receive the spatial stream through which the STA's data are transmitted.

At this time, the Group ID indication information of the PLCP header of the data packet 420 can indicate transmitting data packets 420 through SU-MIMO transmission to a particular STA rather than to a particular group. In other words, if the Group ID indication information has the length of M bits, the Group ID indication information can indicate $2^M$ states. That is to say, if the states are all used for indicating groups. $2^M$ groups can be indicated. However, it may not necessarily be required to use all of the $2^M$ states for indicating groups since the number of actual operating groups may be less than $2^M$. Therefore, a part of $2^M$ states can be used for indicating SU-MIMO transmission rather than indicating Group IDs. As one example, in the case when the Group ID indication information is transmitted through the Group ID field having a length of 6 bits in the PLCP header, 63 states out of $2^6=64$ states available can be assigned for indicating particular groups, while the remaining one state can be used for indicating SU-MIMO transmission or indicating data packets broadcast.

The group definition information transmitted to a particular STA by the AP (information about one or more groups to which the corresponding STA belongs and the position information of the corresponding STA in the each of the corresponding groups) can be transmitted to STAs while included in the management frame with various forms. In a specific method of transmitting the group definition information described below, the name, the form by which it is included in the PPDU, the position (e.g., it is transmitted while being included in the VHT-SIG-A), and the order of transmission are just introduced for an illustration purpose; they can also be implemented by a combination of various embodiments described in the following.

In what follows, various examples of transmitting the group definition information to STAs through the management frame, more specifically, transmitting the group information of the corresponding STA and the position information of the corresponding STA in each individual group are described.

In one embodiment of the present invention, the AP can inform STAs of the data spatial stream configuration through MU-MIMO transmission by using the group definition information. At this time, the group definition information transmitted while being included in the management frame can include Group ID Indicator (GGI) and Spatial Stream Association Indicator (SSAI). The GGI is the information for indicating STAs that are supposed to receive data through MU-MIMO transmission, while the SSAI relates to the information about the data spatial stream configuration that the corresponding STAs are supposed to receive. In other words, the GGI is one example of the information for informing an STA of a group to which the corresponding STA belongs, while the SSAI is one example of the position information of a spatial stream. The GGI and the SSAI can be transmitted while being included in a field of the VHT-SIG of the PLCP preamble header.

The GGIF (GGI Field) that contains the GGI can have the information about which STAs receive the data from the AP through the MU-MIMO transmission; the STAs can be associated logically with the respective GGIF numbers. The AP, before the MU-MIMO transmission, can indicate the value of a particular GGIF and STAs associated logically with the value through the management frame.

FIG. 5 is one example of indicating that the value of GGIF and particular STAs are associated logically with each other in the management frame.

According to the example of FIG. 5, a group ID and the association ID(s) of the STA(s) belonging to the corresponding group are transmitted; and the STA that receives the IDs can know the group to which it belongs. In other words, the STA that received the management frame can check which group its association ID belongs to and then obtain the ID(s) of one or more groups to which it belongs.

FIGS. 6 to 10 illustrate one example of a method for providing STAs with group ID indication information and position indication information of the STAs through the management frame.

FIG. 6 illustrates one example of a method where the AP delivers the group ID information for each individual STA and the position indication information of the STA in the corresponding group. In the FIG. 6, the MU-MIMO Group ID field can indicate the Group ID value directly, or include the information indicating whether STAs receiving the management frame are included in the corresponding group. The Spatial Stream Association ID transmitted subsequently can include the information indicating spatial streams associated logically with the Group ID or the position indication information of the STA in the corresponding group, namely, the information indicating which spatial stream (SS) the STA should receive when receiving MU-MIMO data packets as a member of the corresponding group. In the example of FIG. 6, the pair of the MU-MIMO Group ID Field and the Spatial Stream Association ID can be transmitted as many as the number of groups to which the STAs receiving the management frame belong or as many as the total number of groups. The management frame of FIG. 6 can be transmitted to each individual STA through unicast transmission. Therefore, multiple STAs can belong to the same group and the same spatial stream can be assigned to STAs having different group IDs.

Figure 7:

FIG. 7 is an example where STAs are informed of a group ID and association IDs of spatial streams assigned to the respective STAs belonging to the corresponding group. The AP can transmit a particular Group ID and the Spatial Stream Association ID {0, 1, 2, . . . } corresponding to each Group ID to a plurality of STAs through the management frame.

Figure 8:
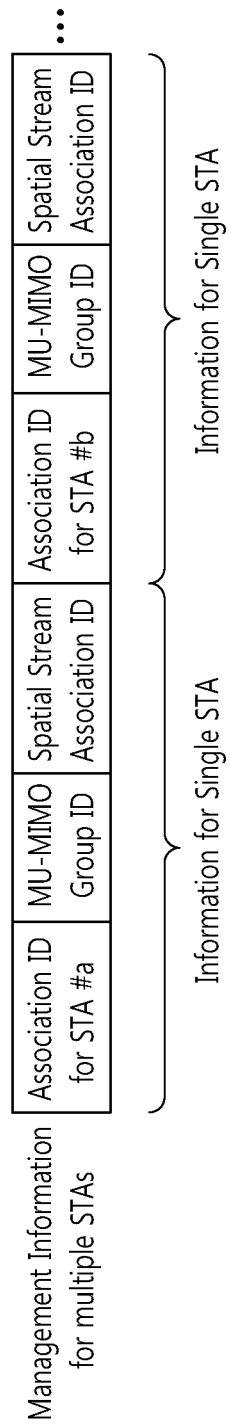

FIG. 8 illustrates one example where the Group ID and the Spatial SSAID are transmitted in pairs according to the STA Association ID.

The Group ID and the Spatial SSAID are transmitted in pairs according to the STA Association ID through the management frame broadcast. Different from the example of FIG. 7, multiple STAs can be associated logically with a single Spatial Stream Association ID.

Figure 9:
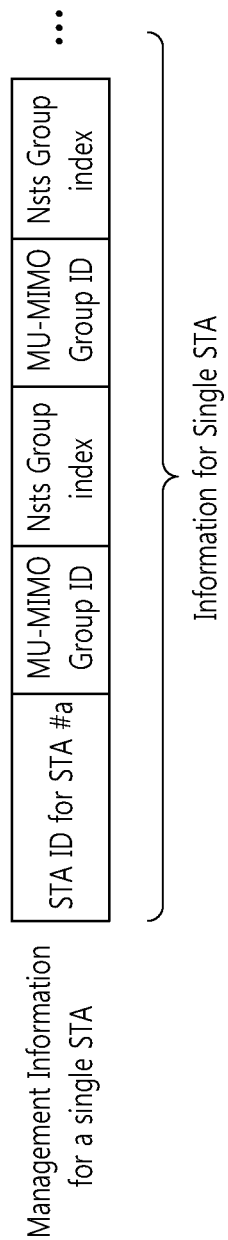

FIG. 9 illustrates a case where information about multiple groups, particular group IDs, and STA IDs are associated with each other for particular STAs. To this end, the STA IDs, multiple Group IDs, and Nsts group index can be transmitted through the management frame.

FIG. 10 is another example of a method for informing multiple STAs of the same spatial stream association ID. As shown in FIG. 10, the AP, by using the management frame, transmits STA-AP association IDs of the STAs associated logically with the Group ID and the Spatial stream ID; and enables the STAs to know the group to which the corresponding STAs belong and spatial streams assigned to the respective STAs.

In a method of transmitting group indication information, position information of an STA, or indication information of a plurality of spatial streams to the STA by using the management frame described above, when specifying an STA was needed, the Association ID of the STA has been used. Depending on the needs, however, the MAC ID (MAC address) of the STA can be utilized instead of the Association ID of the STA. In other words, in the previous example, the Association IDs of the STAs can be replaced with identifiers that enable identifying the STAs. As shown in the example of FIG. 7, when the management frame is transmitted to each individual STA through unicast transmission, the receiver address (RA) of the management frame, namely, the MAC address of the STA can be regarded to have been used as the indicator of the STA.

In addition, according to an embodiment, the Spatial Stream Association ID can be expressed as a group index of NSTS indicating a plurality of spatial streams. In other words, the Spatial Stream Association ID is the index values of NSTS representing numerated values of the spatial streams transmitted by the AP, indicating the spatial streams assigned to the STAs. The NSTS group index and the Spatial Stream Association Index can refer to the same field.

The Spatial Stream Association ID (SSAID) enables the STAs to know which spatial streams are transmitted to them when the STAs receive MU-MIMO data packets. The previous example illustrates a case where the AP informs the STA of a plurality of spatial streams assigned to the corresponding STA by using the Spatial Stream Association ID. In another method, as described earlier, the AP transmits the position information of the STAs in the corresponding group and enables the corresponding STAs to know which spatial streams to receive.

Figure 11:
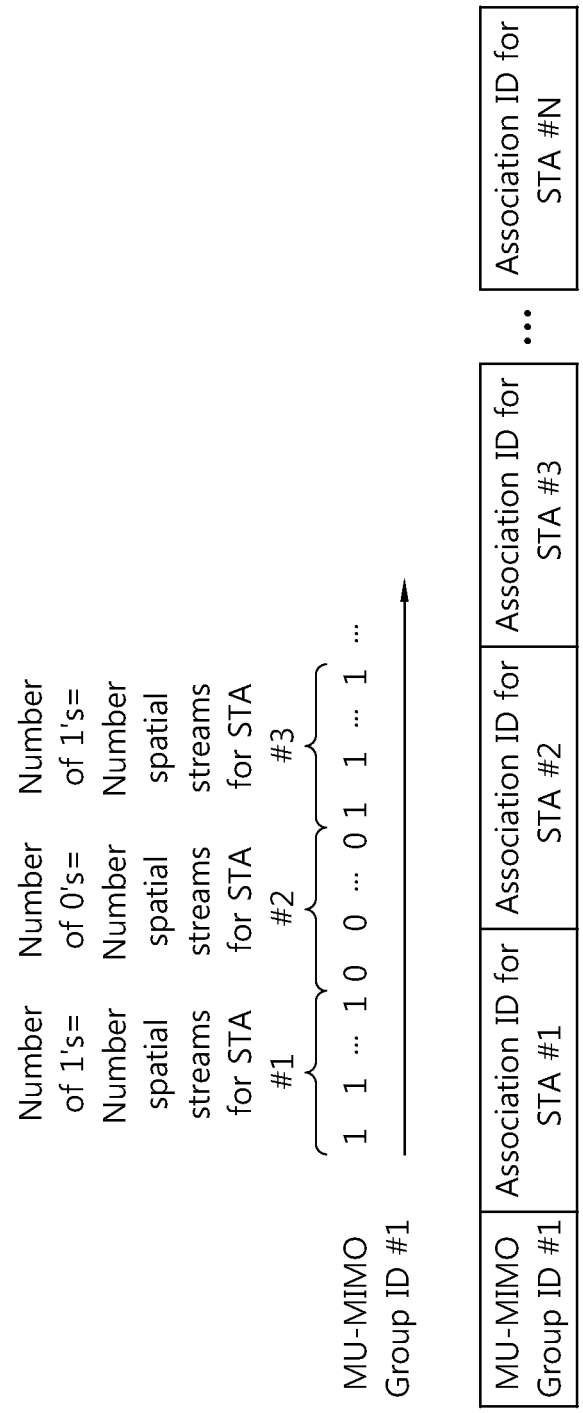
FIG. 11 illustrates one example of configuration of Group Identity Indication Field (GIIF) and Spatial Stream Association ID Field (SSAIF) for MU-MIMO transmission according to another embodiment of the present invention.

FIG. 11 illustrates one example of configuration of Group Identity Indication Field (GIIF) and Spatial Stream Association ID Field (SSAIF) for MU-MIMO transmission according to another embodiment of the present invention.

The AP allows each individual STA to know one or more groups to which it belongs by transmitting logical association between a group ID and each individual STA to all the STAs through the management frame; when the group ID and STAs are attempted to establish logical association, a logical order of the STAs is determined and informed. At this time, the logical association between the group ID and the STAs does not necessarily satisfy a one-to-one relationship; on the contrary, the logical association can be established in the form of one-to-many correspondence.

The SSAIF indicates sequentially in the form of a bitmap how many spatial streams are used by STAs belonging to a particular group ID. As a more concrete example, the number of 1s counted from the MSB of the SSAIF indicates the number of spatial streams used by a first STA belonging to some group ID; the number of 0s from the bit next to the MSB the number of spatial streams used by a second STA, and the number of is subsequent to the previous bit the number of spatial streams by the next STA. In this way, by repetition of 1s and 0s, the number of spatial streams for each individual STA is represented in the form of a string of numerals.

At this time, a first MSB (Most Significant Bit) of a first STA can be omitted. Since no problematic situation occurs if it is already known that at least one or more spatial streams are assigned to the first STA even though the first MSB is omitted for the first STA, SSAIF bit width can be compressed by omitting the first MSB for the first STA.

According to another embodiment of the present invention, the value of the SSAIF, $N_{SS\text{-}Field}^{g}$ is interpreted differently according to the Group ID field. According to the embodiment of the present invention, $N_{SS\text{-}Field}^{g}$ represents the number of spatial streams of STAs belonging to each group. The Group ID field can use a part (for example, one state) of the states that can be characterized individually for SU-MIMO transmission. When the Group ID is specified for SU-MIMO transmission, all the VHT STAs can demodulate and decode the corresponding PPDU in the form for the SU-MIMO transmission and transmit the corresponding data to their MAC layers without differentiating the STAs from each other belonging to the same group for the MU-MIMO transmission.

$N_{SS\text{-}Field}^{g}$ (SSAID) is a field value indicating spatial streams of the STAs involved for the MU-MIMO transmission when a Group ID # g has been received. To be more specific, Equation 1 can be applied to this case:

$$N_{SS\text{-}Field}^{g} = M^{0} \cdot N_{SS}^{0} + M^{1} \cdot N_{SS}^{1} + \ldots + M^{N_{MU\text{-}STA}-1} \cdot N_{SS}^{N_{MU\text{-}STA}-1}, \text{ where } N_{SS}^{k} \in \{0, 1, 2, \ldots, M-1\},$$ [Equation 1]

Where $N_{SS}^{k}$ is a variable indicating the number of spatial streams of the k-th STA belonging to the Group ID # g.

For the convenience of description below, it is assumed that the maximum number of spatial streams that each individual STA can received during MU-MIMO transmission is limited to 4 and thus a data service based on the MU-MIMO transmission can be provided simultaneously for up to four STAs. Also, it is assumed that the number of spatial streams (SS) that each individual STA can deal with is 1, 2, 3, or 4. Further, it is assumed that the maximum number of spatial streams that can be transmitted through one AP is 8.

At this time, if the value of $N_{SS\text{-}Field}^{g}$ transmitted by the AP is 2+4×0+16×3+64×1=114, the number of SSs corresponding to a first STA in the Group ID # g is 3, the number of SSs corresponding to a second STA is 1, and the number of SSs corresponding to a third STA is 4. Although $N_{SS\text{-}Field}^{g}$ was transmitted to the last, fourth STA as if two SSs were assigned to the STA, since the total number of SSs used by the previous three STAs amounts to eight, the number of SSs that can be assigned to the fourth STA is zero.

As another specific embodiment, if the value of $N_{SS\text{-}Field}^{g}$ transmitted by an AP is 3+5×1+25×2+125×0=58 under the same conditions, the number of SSs corresponding to a first STA in the Group ID # g is 3, the number of SSs corresponding to a second STA is 1, and the number of SSs corresponding to a third STA is 3. Now, the number of SSs that can be assigned to the last, fourth STA is zero.

According to the embodiment of the present invention, a signal can be transmitted such that by characterizing $N_{SS\text{-}Field}^{g}$ value, a particular STA is allowed to use zero spatial streams. In this case, the APs can transmit data through the MU-MIMO transmission by using a smaller number of SSs than the maximum allowed number of SSs. In addition, depending on the needs, by controlling the number of STAs receiving a service simultaneously through particular MU-MIMO transmission and the SS that each individual STA can receive in a flexible way, the APs can deal with the SU-MIMO and the MU-MIMO transmission in an optimized way. Also, data transmission can be carried out by distinguishing the SU-MIMO from the MU-MIMO by using the Group ID. The SSAIF can always assume a STA pairing requiring two or more STAs and this property can be used to compress the SSAIF information.

As another implementation example, spatial streams can also be mapped to the individual STAs that are indicated by the respective Group IDs in the form of a table as shown in Table 1.

TABLE 1

| index | SSAID #0 | SSAID #1 | SSAID #2 | SSAID #3 |
|---|---|---|---|---|
| 0 | 0 | 0 | 1 | 1 |
| 1 | 0 | 0 | 1 | 2 |
| 2 | 0 | 0 | 1 | 3 |
| 3 | 0 | 0 | 1 | 4 |
| 4 | 0 | 0 | 2 | 2 |
| 5 | 0 | 0 | 2 | 3 |
| 6 | 0 | 0 | 2 | 4 |
| 7 | 0 | 0 | 3 | 3 |
| 8 | 0 | 0 | 3 | 4 |
| 9 | 0 | 0 | 4 | 4 |
| 10 | 0 | 1 | 1 | 1 |
| 11 | 0 | 1 | 1 | 2 |
| 12 | 0 | 1 | 1 | 3 |
| 13 | 0 | 1 | 1 | 4 |
| 14 | 0 | 1 | 2 | 2 |
| 15 | 0 | 1 | 2 | 3 |
| 16 | 0 | 1 | 2 | 4 |
| 17 | 0 | 1 | 3 | 3 |
| 18 | 0 | 1 | 3 | 4 |

TABLE 1-continued

| index | SSAID #0 | SSAID #1 | SSAID #2 | SSAID #3 |
|---|---|---|---|---|
| 19 | 0 | 2 | 2 | 2 |
| 20 | 0 | 2 | 2 | 3 |
| 21 | 0 | 2 | 2 | 4 |
| 22 | 0 | 2 | 3 | 3 |
| 23 | 1 | 1 | 1 | 1 |
| 24 | 1 | 1 | 1 | 2 |
| 25 | 1 | 1 | 1 | 3 |
| 26 | 1 | 1 | 1 | 4 |
| 27 | 1 | 1 | 2 | 2 |
| 28 | 1 | 1 | 2 | 3 |
| 29 | 1 | 1 | 2 | 4 |
| 30 | 1 | 1 | 3 | 3 |
| 31 | 1 | 2 | 2 | 2 |
| 32 | 1 | 2 | 2 | 3 |
| 33 | 2 | 2 | 2 | 2 |

Table 1 illustrates examples of the index values and the number of spatial streams used for the respective STAs corresponding to the values; matching between the indices and the number of spatial streams used for the respective STAs can be utilized while being modified by various combinations.

By using a total of 34 states in the SSAIF, a maximum of four spatial streams available can be indicated for each individual STA; at the same time, a maximum of eight spatial streams can be signaled. By using part of the information of the SSAIF or by making use of another information field, the order of permuting the STAs can be expressed in the Table above. For example, if the order of the STAs in the Table above is A-B-C-D, the order of A-C-B-D is equally possible; in addition, a total of 24 ways of representing the order of the STAs can be realized.

If a logical association has been established only for STAs from among the Group ID, the SSAIF can express 816 states, namely, multiplication of 34 states representing the number of spatial streams and a total of 24 combinations for the order of the STAs, which can be expressed with 10 bits. Alternatively, it is possible that the 34 states representing the number of spatial streams are expressed with six bits and the 24 states indicating the arrangement of the order of the STAs that inform of the number of spatial streams are expressed with five bits, amounting to 11 bits in total. In the embodiment of the present invention, the total number of spatial streams is limited to eight to compress the SSAIF information and additionally, in the case of MU-MIMO transmission, the number of spatial streams that can be assigned to each individual STA is limited to four.

Besides, the MU-MIMO transmission can be applied by further restricting the number of spatial streams available for each individual STA shown in Table 1. More specifically, by limiting the combination of the STAs that can be expressed in Table 1 and the corresponding spatial streams, the information to be transmitted can be further compressed. For example, if the maximum number of spatial streams available for each individual STA is limited to 2 and a new table is constructed, it is possible to make a table as shown in Table 2. The indices of Table 2 and the number of spatial streams assigned to the STAs corresponding to the indices have been introduced for an illustrative purpose; the relationship can be changed by various combinations and the maximum number of spatial streams available for a single STA can also be changed.

TABLE 2

| index | SSAID#0 | SSAID#1 | SSAID#2 | SSAID#3 |
|---|---|---|---|---|
| 0 | 0 | 0 | 1 | 1 |
| 1 | 0 | 0 | 1 | 2 |
| 2 | 0 | 0 | 2 | 2 |
| 3 | 0 | 1 | 1 | 1 |
| 4 | 0 | 1 | 1 | 2 |
| 5 | 0 | 1 | 2 | 2 |
| 6 | 0 | 2 | 2 | 2 |
| 7 | 1 | 1 | 1 | 1 |
| 8 | 1 | 1 | 1 | 2 |
| 9 | 1 | 1 | 2 | 2 |
| 10 | 1 | 2 | 2 | 2 |
| 11 | 2 | 2 | 2 | 2 |

If one takes account of the fact that data are transmitted to at least two or more STAs in the MU-MIMO transmission and the maximum number of spatial streams that can be transmitted by an AP, a total of 338 states only are required for the SSAIF. In other words, 9 bits (which can express 512 states) are required to express the whole information.

In Table 3, each STA can support a maximum of 4 spatial streams; Table 4-3 illustrates SSAIDs that can be expressed when a maximum of 8 spatial streams are allowed to be transmitted. When an actual system is supposed to be implemented, the corresponding field indices can be permuted in different ways.

TABLE 3

| Field index | SSAID#0 | SSAID#1 | SSAID#2 | SSAID#3 |
|---|---|---|---|---|
| 0 | 0 | 0 | 1 | 1 |
| 1 | 0 | 0 | 1 | 2 |
| 2 | 0 | 0 | 1 | 3 |
| 3 | 0 | 0 | 1 | 4 |
| 4 | 0 | 0 | 2 | 1 |
| 5 | 0 | 0 | 2 | 2 |
| 6 | 0 | 0 | 2 | 3 |
| 7 | 0 | 0 | 2 | 4 |
| 8 | 0 | 0 | 3 | 1 |
| 9 | 0 | 0 | 3 | 2 |
| 10 | 0 | 0 | 3 | 3 |
| 11 | 0 | 0 | 3 | 4 |
| 12 | 0 | 0 | 4 | 1 |
| 13 | 0 | 0 | 4 | 2 |
| 14 | 0 | 0 | 4 | 3 |
| 15 | 0 | 0 | 4 | 4 |
| 16 | 0 | 1 | 0 | 1 |
| 17 | 0 | 1 | 0 | 2 |
| 18 | 0 | 1 | 0 | 3 |
| 19 | 0 | 1 | 0 | 4 |
| 20 | 0 | 1 | 1 | 0 |
| 21 | 0 | 1 | 1 | 1 |
| 22 | 0 | 1 | 1 | 2 |
| 23 | 0 | 1 | 1 | 3 |
| 24 | 0 | 1 | 1 | 4 |
| 25 | 0 | 1 | 2 | 0 |
| 26 | 0 | 1 | 2 | 1 |
| 27 | 0 | 1 | 2 | 2 |
| 28 | 0 | 1 | 2 | 3 |
| 29 | 0 | 1 | 2 | 4 |
| 30 | 0 | 1 | 3 | 0 |
| 31 | 0 | 1 | 3 | 1 |
| 32 | 0 | 1 | 3 | 2 |
| 33 | 0 | 1 | 3 | 3 |
| 34 | 0 | 1 | 3 | 4 |
| 35 | 0 | 1 | 4 | 0 |
| 36 | 0 | 1 | 4 | 1 |
| 37 | 0 | 1 | 4 | 2 |
| 38 | 0 | 1 | 4 | 3 |
| 39 | 0 | 2 | 0 | 1 |
| 40 | 0 | 2 | 0 | 2 |
| 41 | 0 | 2 | 0 | 3 |
| 42 | 0 | 2 | 0 | 4 |
| 43 | 0 | 2 | 1 | 0 |

TABLE 3-continued

| Field index | SSAID#0 | SSAID#1 | SSAID#2 | SSAID#3 |
|---|---|---|---|---|
| 44 | 0 | 2 | 1 | 1 |
| 45 | 0 | 2 | 1 | 2 |
| 46 | 0 | 2 | 1 | 3 |
| 47 | 0 | 2 | 1 | 4 |
| 48 | 0 | 2 | 2 | 0 |
| 49 | 0 | 2 | 2 | 1 |
| 50 | 0 | 2 | 2 | 2 |
| 51 | 0 | 2 | 2 | 3 |
| 52 | 0 | 2 | 2 | 4 |
| 53 | 0 | 2 | 3 | 0 |
| 54 | 0 | 2 | 3 | 1 |
| 55 | 0 | 2 | 3 | 2 |
| 56 | 0 | 2 | 3 | 3 |
| 57 | 0 | 2 | 4 | 0 |
| 58 | 0 | 2 | 4 | 1 |
| 59 | 0 | 2 | 4 | 2 |
| 60 | 0 | 3 | 0 | 1 |
| 61 | 0 | 3 | 0 | 2 |
| 62 | 0 | 3 | 0 | 3 |
| 63 | 0 | 3 | 0 | 4 |
| 64 | 0 | 3 | 1 | 0 |
| 65 | 0 | 3 | 1 | 1 |
| 66 | 0 | 3 | 1 | 2 |
| 67 | 0 | 3 | 1 | 3 |
| 68 | 0 | 3 | 1 | 4 |
| 69 | 0 | 3 | 2 | 0 |
| 70 | 0 | 3 | 2 | 1 |
| 71 | 0 | 3 | 2 | 2 |
| 72 | 0 | 3 | 2 | 3 |
| 73 | 0 | 3 | 3 | 0 |
| 74 | 0 | 3 | 3 | 1 |
| 75 | 0 | 3 | 3 | 2 |
| 76 | 0 | 3 | 4 | 0 |
| 77 | 0 | 3 | 4 | 1 |
| 78 | 0 | 4 | 0 | 1 |
| 79 | 0 | 4 | 0 | 2 |
| 80 | 0 | 4 | 0 | 3 |
| 81 | 0 | 4 | 0 | 4 |
| 82 | 0 | 4 | 1 | 0 |
| 83 | 0 | 4 | 1 | 1 |
| 84 | 0 | 4 | 1 | 2 |
| 85 | 0 | 4 | 1 | 3 |
| 86 | 0 | 4 | 2 | 0 |
| 87 | 0 | 4 | 2 | 1 |
| 88 | 0 | 4 | 2 | 2 |
| 89 | 0 | 4 | 3 | 0 |
| 90 | 0 | 4 | 3 | 1 |
| 91 | 0 | 4 | 4 | 0 |
| 92 | 1 | 0 | 0 | 1 |
| 93 | 1 | 0 | 0 | 2 |
| 94 | 1 | 0 | 0 | 3 |
| 95 | 1 | 0 | 0 | 4 |
| 96 | 1 | 0 | 1 | 0 |
| 97 | 1 | 0 | 1 | 1 |
| 98 | 1 | 0 | 1 | 2 |
| 99 | 1 | 0 | 1 | 3 |
| 100 | 1 | 0 | 1 | 4 |
| 101 | 1 | 0 | 2 | 0 |
| 102 | 1 | 0 | 2 | 1 |
| 103 | 1 | 0 | 2 | 2 |
| 104 | 1 | 0 | 2 | 3 |
| 105 | 1 | 0 | 2 | 4 |
| 106 | 1 | 0 | 3 | 0 |
| 107 | 1 | 0 | 3 | 1 |
| 108 | 1 | 0 | 3 | 2 |
| 109 | 1 | 0 | 3 | 3 |
| 110 | 1 | 0 | 3 | 4 |
| 111 | 1 | 0 | 4 | 0 |
| 112 | 1 | 0 | 4 | 1 |
| 113 | 1 | 0 | 4 | 2 |
| 114 | 1 | 0 | 4 | 3 |
| 115 | 1 | 1 | 0 | 0 |
| 116 | 1 | 1 | 0 | 1 |
| 117 | 1 | 1 | 0 | 2 |
| 118 | 1 | 1 | 0 | 3 |
| 119 | 1 | 1 | 0 | 4 |
| 120 | 1 | 1 | 1 | 0 |
| 121 | 1 | 1 | 1 | 1 |
| 122 | 1 | 1 | 1 | 2 |
| 123 | 1 | 1 | 1 | 3 |
| 124 | 1 | 1 | 1 | 4 |
| 125 | 1 | 1 | 2 | 0 |
| 126 | 1 | 1 | 2 | 1 |
| 127 | 1 | 1 | 2 | 2 |
| 128 | 1 | 1 | 2 | 3 |
| 129 | 1 | 1 | 2 | 4 |
| 130 | 1 | 1 | 3 | 0 |
| 131 | 1 | 1 | 3 | 1 |
| 132 | 1 | 1 | 3 | 2 |
| 133 | 1 | 1 | 3 | 3 |
| 134 | 1 | 1 | 4 | 0 |
| 135 | 1 | 1 | 4 | 1 |
| 136 | 1 | 1 | 4 | 2 |
| 137 | 1 | 2 | 0 | 0 |
| 138 | 1 | 2 | 0 | 1 |
| 139 | 1 | 2 | 0 | 2 |
| 140 | 1 | 2 | 0 | 3 |
| 141 | 1 | 2 | 0 | 4 |
| 142 | 1 | 2 | 1 | 0 |
| 143 | 1 | 2 | 1 | 1 |
| 144 | 1 | 2 | 1 | 2 |
| 145 | 1 | 2 | 1 | 3 |
| 146 | 1 | 2 | 1 | 4 |
| 147 | 1 | 2 | 2 | 0 |
| 148 | 1 | 2 | 2 | 1 |
| 149 | 1 | 2 | 2 | 2 |
| 150 | 1 | 2 | 2 | 3 |
| 151 | 1 | 2 | 3 | 0 |
| 152 | 1 | 2 | 3 | 1 |
| 153 | 1 | 2 | 3 | 2 |
| 154 | 1 | 2 | 4 | 0 |
| 155 | 1 | 2 | 4 | 1 |
| 156 | 1 | 3 | 0 | 0 |
| 157 | 1 | 3 | 0 | 1 |
| 158 | 1 | 3 | 0 | 2 |
| 159 | 1 | 3 | 0 | 3 |
| 160 | 1 | 3 | 0 | 4 |
| 161 | 1 | 3 | 1 | 0 |
| 162 | 1 | 3 | 1 | 1 |
| 163 | 1 | 3 | 1 | 2 |
| 164 | 1 | 3 | 1 | 3 |
| 165 | 1 | 3 | 2 | 0 |
| 166 | 1 | 3 | 2 | 1 |
| 167 | 1 | 3 | 2 | 2 |
| 168 | 1 | 3 | 3 | 0 |
| 169 | 1 | 3 | 3 | 1 |
| 170 | 1 | 3 | 4 | 0 |
| 171 | 1 | 4 | 0 | 0 |
| 172 | 1 | 4 | 0 | 1 |
| 173 | 1 | 4 | 0 | 2 |
| 174 | 1 | 4 | 0 | 3 |
| 175 | 1 | 4 | 1 | 0 |
| 176 | 1 | 4 | 1 | 1 |
| 177 | 1 | 4 | 1 | 2 |
| 178 | 1 | 4 | 2 | 0 |
| 179 | 1 | 4 | 2 | 1 |
| 180 | 1 | 4 | 3 | 0 |
| 181 | 2 | 0 | 0 | 1 |
| 182 | 2 | 0 | 0 | 2 |
| 183 | 2 | 0 | 0 | 3 |
| 184 | 2 | 0 | 0 | 4 |
| 185 | 2 | 0 | 1 | 0 |
| 186 | 2 | 0 | 1 | 1 |
| 187 | 2 | 0 | 1 | 2 |
| 188 | 2 | 0 | 1 | 3 |
| 189 | 2 | 0 | 1 | 4 |
| 190 | 2 | 0 | 2 | 0 |
| 191 | 2 | 0 | 2 | 1 |
| 192 | 2 | 0 | 2 | 2 |
| 193 | 2 | 0 | 2 | 3 |
| 194 | 2 | 0 | 2 | 4 |
| 195 | 2 | 0 | 3 | 0 |
| 196 | 2 | 0 | 3 | 1 |
| 197 | 2 | 0 | 3 | 2 |
| 198 | 2 | 0 | 3 | 3 |
| 199 | 2 | 0 | 4 | 0 |

TABLE 3-continued

| Field index | SSAID#0 | SSAID#1 | SSAID#2 | SSAID#3 |
|---|---|---|---|---|
| 200 | 2 | 0 | 4 | 1 |
| 201 | 2 | 0 | 4 | 2 |
| 202 | 2 | 1 | 0 | 0 |
| 203 | 2 | 1 | 0 | 1 |
| 204 | 2 | 1 | 0 | 2 |
| 205 | 2 | 1 | 0 | 3 |
| 206 | 2 | 1 | 0 | 4 |
| 207 | 2 | 1 | 1 | 0 |
| 208 | 2 | 1 | 1 | 1 |
| 209 | 2 | 1 | 1 | 2 |
| 210 | 2 | 1 | 1 | 3 |
| 211 | 2 | 1 | 1 | 4 |
| 212 | 2 | 1 | 2 | 0 |
| 213 | 2 | 1 | 2 | 1 |
| 214 | 2 | 1 | 2 | 2 |
| 215 | 2 | 1 | 2 | 3 |
| 216 | 2 | 1 | 3 | 0 |
| 217 | 2 | 1 | 3 | 1 |
| 218 | 2 | 1 | 3 | 2 |
| 219 | 2 | 1 | 4 | 0 |
| 220 | 2 | 1 | 4 | 1 |
| 221 | 2 | 2 | 0 | 0 |
| 222 | 2 | 2 | 0 | 1 |
| 223 | 2 | 2 | 0 | 2 |
| 224 | 2 | 2 | 0 | 3 |
| 225 | 2 | 2 | 0 | 4 |
| 226 | 2 | 2 | 1 | 0 |
| 227 | 2 | 2 | 1 | 1 |
| 228 | 2 | 2 | 1 | 2 |
| 229 | 2 | 2 | 1 | 3 |
| 230 | 2 | 2 | 2 | 0 |
| 231 | 2 | 2 | 2 | 1 |
| 232 | 2 | 2 | 2 | 2 |
| 233 | 2 | 2 | 3 | 0 |
| 234 | 2 | 2 | 3 | 1 |
| 235 | 2 | 2 | 4 | 0 |
| 236 | 2 | 3 | 0 | 0 |
| 237 | 2 | 3 | 0 | 1 |
| 238 | 2 | 3 | 0 | 2 |
| 239 | 2 | 3 | 0 | 3 |
| 240 | 2 | 3 | 1 | 0 |
| 241 | 2 | 3 | 1 | 1 |
| 242 | 2 | 3 | 1 | 2 |
| 243 | 2 | 3 | 2 | 0 |
| 244 | 2 | 3 | 2 | 1 |
| 245 | 2 | 3 | 3 | 0 |
| 246 | 2 | 4 | 0 | 0 |
| 247 | 2 | 4 | 0 | 1 |
| 248 | 2 | 4 | 0 | 2 |
| 249 | 2 | 4 | 1 | 0 |
| 250 | 2 | 4 | 1 | 1 |
| 251 | 2 | 4 | 2 | 0 |
| 252 | 3 | 0 | 0 | 1 |
| 253 | 3 | 0 | 0 | 2 |
| 254 | 3 | 0 | 0 | 3 |
| 255 | 3 | 0 | 0 | 4 |
| 256 | 3 | 0 | 1 | 0 |
| 257 | 3 | 0 | 1 | 1 |
| 258 | 3 | 0 | 1 | 2 |
| 259 | 3 | 0 | 1 | 3 |
| 260 | 3 | 0 | 1 | 4 |
| 261 | 3 | 0 | 2 | 0 |
| 262 | 3 | 0 | 2 | 1 |
| 263 | 3 | 0 | 2 | 2 |
| 264 | 3 | 0 | 2 | 3 |
| 265 | 3 | 0 | 3 | 0 |
| 266 | 3 | 0 | 3 | 1 |
| 267 | 3 | 0 | 3 | 2 |
| 268 | 3 | 0 | 4 | 0 |
| 269 | 3 | 0 | 4 | 1 |
| 270 | 3 | 1 | 0 | 0 |
| 271 | 3 | 1 | 0 | 1 |
| 272 | 3 | 1 | 0 | 2 |
| 273 | 3 | 1 | 0 | 3 |
| 274 | 3 | 1 | 0 | 4 |
| 275 | 3 | 1 | 1 | 0 |
| 276 | 3 | 1 | 1 | 1 |
| 277 | 3 | 1 | 1 | 2 |
| 278 | 3 | 1 | 1 | 3 |
| 279 | 3 | 1 | 2 | 0 |
| 280 | 3 | 1 | 2 | 1 |
| 281 | 3 | 1 | 2 | 2 |
| 282 | 3 | 1 | 3 | 0 |
| 283 | 3 | 1 | 3 | 1 |
| 284 | 3 | 1 | 4 | 0 |
| 285 | 3 | 2 | 0 | 0 |
| 286 | 3 | 2 | 0 | 1 |
| 287 | 3 | 2 | 0 | 2 |
| 288 | 3 | 2 | 0 | 3 |
| 289 | 3 | 2 | 1 | 0 |
| 290 | 3 | 2 | 1 | 1 |
| 291 | 3 | 2 | 1 | 2 |
| 292 | 3 | 2 | 2 | 0 |
| 293 | 3 | 2 | 2 | 1 |
| 294 | 3 | 2 | 3 | 0 |
| 295 | 3 | 3 | 0 | 0 |
| 296 | 3 | 3 | 0 | 1 |
| 297 | 3 | 3 | 0 | 2 |
| 298 | 3 | 3 | 1 | 0 |
| 299 | 3 | 3 | 1 | 1 |
| 300 | 3 | 3 | 2 | 0 |
| 301 | 3 | 4 | 0 | 0 |
| 302 | 3 | 4 | 0 | 1 |
| 303 | 3 | 4 | 1 | 0 |
| 304 | 4 | 0 | 0 | 1 |
| 305 | 4 | 0 | 0 | 2 |
| 306 | 4 | 0 | 0 | 3 |
| 307 | 4 | 0 | 0 | 4 |
| 308 | 4 | 0 | 1 | 0 |
| 309 | 4 | 0 | 1 | 1 |
| 310 | 4 | 0 | 1 | 2 |
| 311 | 4 | 0 | 1 | 3 |
| 312 | 4 | 0 | 2 | 0 |
| 313 | 4 | 0 | 2 | 1 |
| 314 | 4 | 0 | 2 | 2 |
| 315 | 4 | 0 | 3 | 0 |
| 316 | 4 | 0 | 3 | 1 |
| 317 | 4 | 0 | 4 | 0 |
| 318 | 4 | 1 | 0 | 0 |
| 319 | 4 | 1 | 0 | 1 |
| 320 | 4 | 1 | 0 | 2 |
| 321 | 4 | 1 | 0 | 3 |
| 322 | 4 | 1 | 1 | 0 |
| 323 | 4 | 1 | 1 | 1 |
| 324 | 4 | 1 | 1 | 2 |
| 325 | 4 | 1 | 2 | 0 |
| 326 | 4 | 1 | 2 | 1 |
| 327 | 4 | 1 | 3 | 0 |
| 328 | 4 | 2 | 0 | 0 |
| 329 | 4 | 2 | 0 | 1 |
| 330 | 4 | 2 | 0 | 2 |
| 331 | 4 | 2 | 1 | 0 |
| 332 | 4 | 2 | 1 | 1 |
| 333 | 4 | 2 | 2 | 0 |
| 334 | 4 | 3 | 0 | 0 |
| 335 | 4 | 3 | 0 | 1 |
| 336 | 4 | 3 | 1 | 0 |
| 337 | 4 | 4 | 0 | 0 |

In Table 4, each STA can support a maximum of 2 spatial streams; Table 4 illustrates SSAIDs that can be expressed when a maximum of 8 spatial streams are allowed to be transmitted. When an actual system is supposed to be implemented, the corresponding field indices can be permuted in different ways.

TABLE 4

| Field index | SSAID#0 | SSAID#1 | SSAID#2 | SSAID#3 |
|---|---|---|---|---|
| 0 | 0 | 0 | 1 | 1 |
| 1 | 0 | 0 | 1 | 2 |
| 2 | 0 | 0 | 2 | 1 |

TABLE 4-continued

| Field index | SSAID#0 | SSAID#1 | SSAID#2 | SSAID#3 |
|---|---|---|---|---|
| 3 | 0 | 0 | 2 | 2 |
| 4 | 0 | 1 | 0 | 1 |
| 5 | 0 | 1 | 0 | 2 |
| 6 | 0 | 1 | 1 | 0 |
| 7 | 0 | 1 | 1 | 1 |
| 8 | 0 | 1 | 1 | 2 |
| 9 | 0 | 1 | 2 | 0 |
| 10 | 0 | 1 | 2 | 1 |
| 11 | 0 | 1 | 2 | 2 |
| 12 | 0 | 2 | 0 | 1 |
| 13 | 0 | 2 | 0 | 2 |
| 14 | 0 | 2 | 1 | 0 |
| 15 | 0 | 2 | 1 | 1 |
| 16 | 0 | 2 | 1 | 2 |
| 17 | 0 | 2 | 2 | 0 |
| 18 | 0 | 2 | 2 | 1 |
| 19 | 0 | 2 | 2 | 2 |
| 20 | 1 | 0 | 0 | 1 |
| 21 | 1 | 0 | 0 | 2 |
| 22 | 1 | 0 | 1 | 0 |
| 23 | 1 | 0 | 1 | 1 |
| 24 | 1 | 0 | 1 | 2 |
| 25 | 1 | 0 | 2 | 0 |
| 26 | 1 | 0 | 2 | 1 |
| 27 | 1 | 0 | 2 | 2 |
| 28 | 1 | 1 | 0 | 0 |
| 29 | 1 | 1 | 0 | 1 |
| 30 | 1 | 1 | 0 | 2 |
| 31 | 1 | 1 | 1 | 0 |
| 32 | 1 | 1 | 1 | 1 |
| 33 | 1 | 1 | 1 | 2 |
| 34 | 1 | 1 | 2 | 0 |
| 35 | 1 | 1 | 2 | 1 |
| 36 | 1 | 1 | 2 | 2 |
| 37 | 1 | 2 | 0 | 0 |
| 38 | 1 | 2 | 0 | 1 |
| 39 | 1 | 2 | 0 | 2 |
| 40 | 1 | 2 | 1 | 0 |
| 41 | 1 | 2 | 1 | 1 |
| 42 | 1 | 2 | 1 | 2 |
| 43 | 1 | 2 | 2 | 0 |
| 44 | 1 | 2 | 2 | 1 |
| 45 | 1 | 2 | 2 | 2 |
| 46 | 2 | 0 | 0 | 1 |
| 47 | 2 | 0 | 0 | 2 |
| 48 | 2 | 0 | 1 | 0 |
| 49 | 2 | 0 | 1 | 1 |
| 50 | 2 | 0 | 1 | 2 |
| 51 | 2 | 0 | 2 | 0 |
| 52 | 2 | 0 | 2 | 1 |
| 53 | 2 | 0 | 2 | 2 |
| 54 | 2 | 1 | 0 | 0 |
| 55 | 2 | 1 | 0 | 1 |
| 56 | 2 | 1 | 0 | 2 |
| 57 | 2 | 1 | 1 | 0 |
| 58 | 2 | 1 | 1 | 1 |
| 59 | 2 | 1 | 1 | 2 |
| 60 | 2 | 1 | 2 | 0 |
| 61 | 2 | 1 | 2 | 1 |
| 62 | 2 | 1 | 2 | 2 |
| 63 | 2 | 2 | 0 | 0 |
| 64 | 2 | 2 | 0 | 1 |
| 65 | 2 | 2 | 0 | 2 |
| 66 | 2 | 2 | 1 | 0 |
| 67 | 2 | 2 | 1 | 1 |
| 68 | 2 | 2 | 1 | 2 |
| 69 | 2 | 2 | 2 | 0 |
| 70 | 2 | 2 | 2 | 1 |
| 71 | 2 | 2 | 2 | 2 |

Meanwhile, in the case of downlink MU-MIMO transmission, when the number of STAs receiving a service from the AP is large and the combination of STAs that can be indicated by the Group ID is restricted a lot, using all of the Group IDs can be inefficient. In particular, if the sleep/wake state of each individual STA is not fully synchronized with each other while the STAs operating in a Power Saving Mode are grouped and logically connected to each other by a group ID, the AP should change either the group by using a management PPDU frame or the configuration of the power saving mode.

Therefore, the present invention additionally provides a method for operating STAs separately from a group ID. As shown in Tables 1 and 2, in order for a particular, virtual STA to obtain the number of spatial streams, each individual STA informed of its STA number ID determined within the corresponding group through the Group ID. Separate from the Group ID, each STA can determine the corresponding number ID through a management frame or predetermination. In the present invention, the STA number ID is called SSAID. The SSAID represents the position of a stream among the streams serviced at the same time by an AP, which should be received by STAs. For example, if STA1, STA2, STA3, and STA4 correspond respectively to SSAID 1, 2, 3, and 4, each individual STA receives a first package of streams, a second package of streams, a third package of streams, and a fourth package of streams from among a plurality of streams serviced by the AP. In other words, all of the STAs have a single SSAID. If the maximum number of STAs serviced at the same time is N, the value of the SSAID can range from 1 to N.

According to another embodiment of the present invention, the SSAID of each STA can be indicated through the management frame, but the SSAID can also be indicated through a predetermined rule. For example, the SSAID can be mapped to a function of the association ID assigned during the process where an STA establishes an association with an AP for transmitting and receiving data. As a more specific example, a module N value of the association ID can be used for the SSAID (it is assumed that the value of the SSAID ranges from 0 to N−1). In addition, each STA is informed of a Group ID and the order of the STA in the corresponding Group by following the Group ID scheme; at the same time, the STA can be informed of the number of spatial streams by using the SSAID assigned previously separately from the Group ID.

For example, if the Group ID field corresponds to a particular state (i.e., index 15 in the case of transmitting a 4-bit Group ID), the SSAID is determined as the order of the STAs connected logically with the same Group ID and the STAs in the corresponding group are determined. If the Group ID field corresponds to a different state, each spatial stream is received by using the SSAID predetermined or assigned irrespective of the Group ID. In the latter case, multiple STAs can occupy the same SSAID and all of the multiple STAs can carry out decoding the combination of particular spatial streams.

To implement downlink MU-MIMO transmission, the VHT SIG field of the PLCP header includes a group ID and the MU-MIMO set of spatial stream sub-field. The reserved Group ID 16 is used for the downlink MU-MIMO transmission. The downlink MU-MIMO transmission is carried out for those STAs not belonging to a group. At this time, each individual STA receives the corresponding downlink (DL) MU-MIMO transmission data based on its SSAID.

The MU-MIMO Set of Spatial Streams sub-field is a rotated sequence comprising 0s and 1s, informing each individual STA of the number of spatial streams assigned. For example, in the case of 0000 1111 0000 1111 0000, it indicates that four spatial streams have been assigned to each of the 1st STA, the 2nd STA, the 3rd STA, and the 4th STA. In this case, the 1st STA indicates those terminals with the SSAID of 1. The 2nd STA indicates those terminals with the SSAID of 2; the 3rd STA those terminals with the SSAID of 3; the 4th STA those terminals with the SSAID of 4. For example, STA A and STA B enter the wakeup mode while operating in the power saving mode; and STA A and STA B are not grouped yet. However, the SSAID value has already been assigned to all the STAs by an AP. It is assumed that the SSAID of STA A is 1; the SSAID of STA B and STA C is 2; and the SSAID of STA D is 4. It is also assumed that the AP has transmitted eight spatial streams to each of the STA A and STA B. In this case, the group ID is 16 and the MU-MIMO Set of Spatial Streams field is set to 0000 0000 1111 1111, comprising the PLCP header.

Each of the STAs, if the group ID corresponds to a particular state (e.g., index 15), regards the particular state as applying to itself (this behavior may not apply to all the STAs but only to the STAs not grouped into a group). The STA A also regards the downlink MU-MIMO transmission data as applying to itself and performs channel estimation through a 1st LTF sequence set. (It is because the SSAID of STA A is 1.) The STA B and STA C also regard the downlink MU-MIMO transmission data just received as applying to themselves, performing channel estimation through a 2nd LTF sequence set. (This is because the SSAID of the STA B and the STA C is 2.) However, in this case, since the STA C is not a target terminal of the downlink MU-MIMO transmission, the STA C is as good as overhearing. Since the above example assumed two STAs, the 4th LTF sequence set is not needed and thus, the STA D does not perform the task of channel estimation. (Since the SSAID of the STA D is 4, the STA D considers the 4th LTF sequence set as the channel information for itself.) Also, the STA C cannot detect the LTF sequence set directed to the STA B due to pre-coding. In this case, too, the STA C realizes that the current DL MU-MIMO transmission is not intended for itself and stops the overhearing.

According to another embodiment of the present invention, a group of STAs can be operated in the MAC layer to support MU-MIMO transmission of a large number of STAs. In particular, the present invention operates a group of STAs by using an AP, but operates a group indicated in the PHY layer as a subset of a group indicated in the MAC layer.

In the MU-MIMO transmission, STAs are grouped into a particular group and a particular Group index is assigned to the group; the STAs are informed of the Group index so that which particular STAs are scheduled simultaneously to participate in the MU-MIMO transmission for receiving data. In general, the number of groups that can be operated should be large enough to support a combination of a large number of STAs. The combination of particular STAs should be informed of through the PHY layer so that the corresponding, data-receiving STAs determines whether to receive data and based on the determination result, receives data packets by demodulating and decoding particular spatial streams. However, delivering a large amount of information through the PHY layer causes large signaling overhead and a related protocol to support the overhead can be complicated.

According to an embodiment of the present invention, to solve the above problem, a group hierarchy can be constructed. The information signaled in the PHY layer corresponds to sets of STA grouping, while the information signaled in the MAC layer the final sets of STA grouping. At this time, the information signaled in the PHY layer can be transmitted to the PLCP header such as VHT-SIG, while the information signaled in the MAC layer can be transmitted in the MAC layer in the form of data packets.

Figure 12:
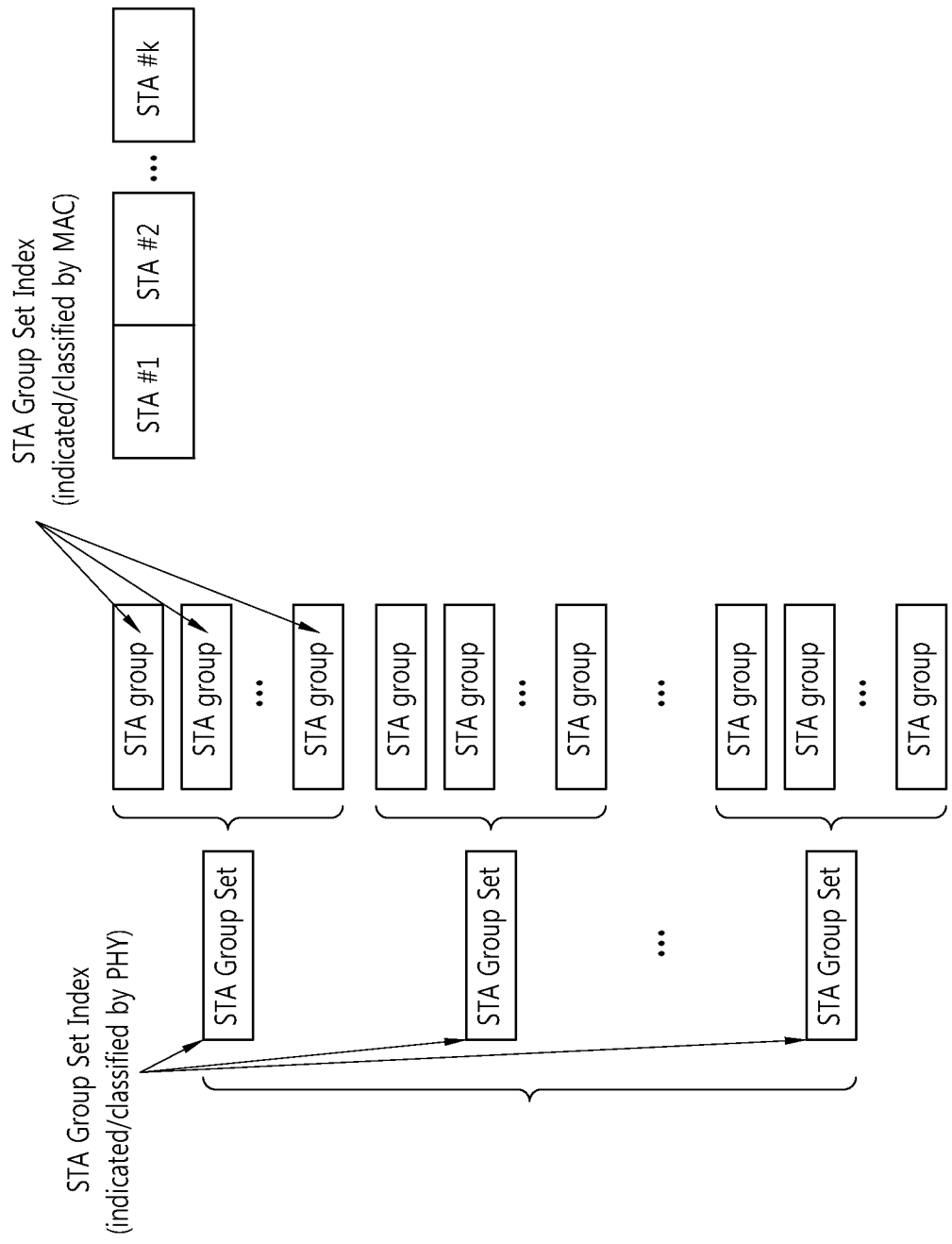
FIG. 12 illustrates one example of indicating STA group sets in the PHY layer and indicating STA groups in the MAC layer according to an embodiment of the present invention.

FIG. 12 illustrates one example of indicating STA group sets in the PHY layer and indicating STA groups in the MAC layer according to an embodiment of the present invention.

When a group set is indicated in the PHY layer, the group set can indicate a group of a plurality of STAs. For example, if the information in the PHY layer indicates Group Set #1, the corresponding Group Set may include Group #1, #2, #3, and #4. Each individual group represents a set of particular STAs. As one example, each of the corresponding groups can have a set of STAs as shown in Table 5. At this time, A, B, C, D, E, F, G, and H represents STAs different from each other.

TABLE 5

| GROUP | STA |
| --- | --- |
| Group #1 | A, B, C, G |
| Group #2 | A, B, F, D |
| Group #3 | A, E, C, D |
| Group #4 | H, E, F, G |

In general, each STA can belong to multiple groups; to reduce the complexity imposed on the STA that receives data, it is preferred that the order of the STA among the multiple groups to which the STA belongs should be informed of.

If groups are already defined, the AP transmits data through the MU-MIMO transmission by indicating a Group Set index in the VHT-SIG of the PLCP header of the PPDU frame through which the data are transmitted; the Group Set index indicated in the VHT-SIG sometimes corresponds to a plurality of groups. While a plurality of groups are indicated, a plurality of STAs may decode a particular set of spatial streams as if they correspond to the spatial streams intended for the STAs; in this case, whether the data packets are associated with the STAs or not can be known from the MAC ID in the MAC layer.

Figure 13:
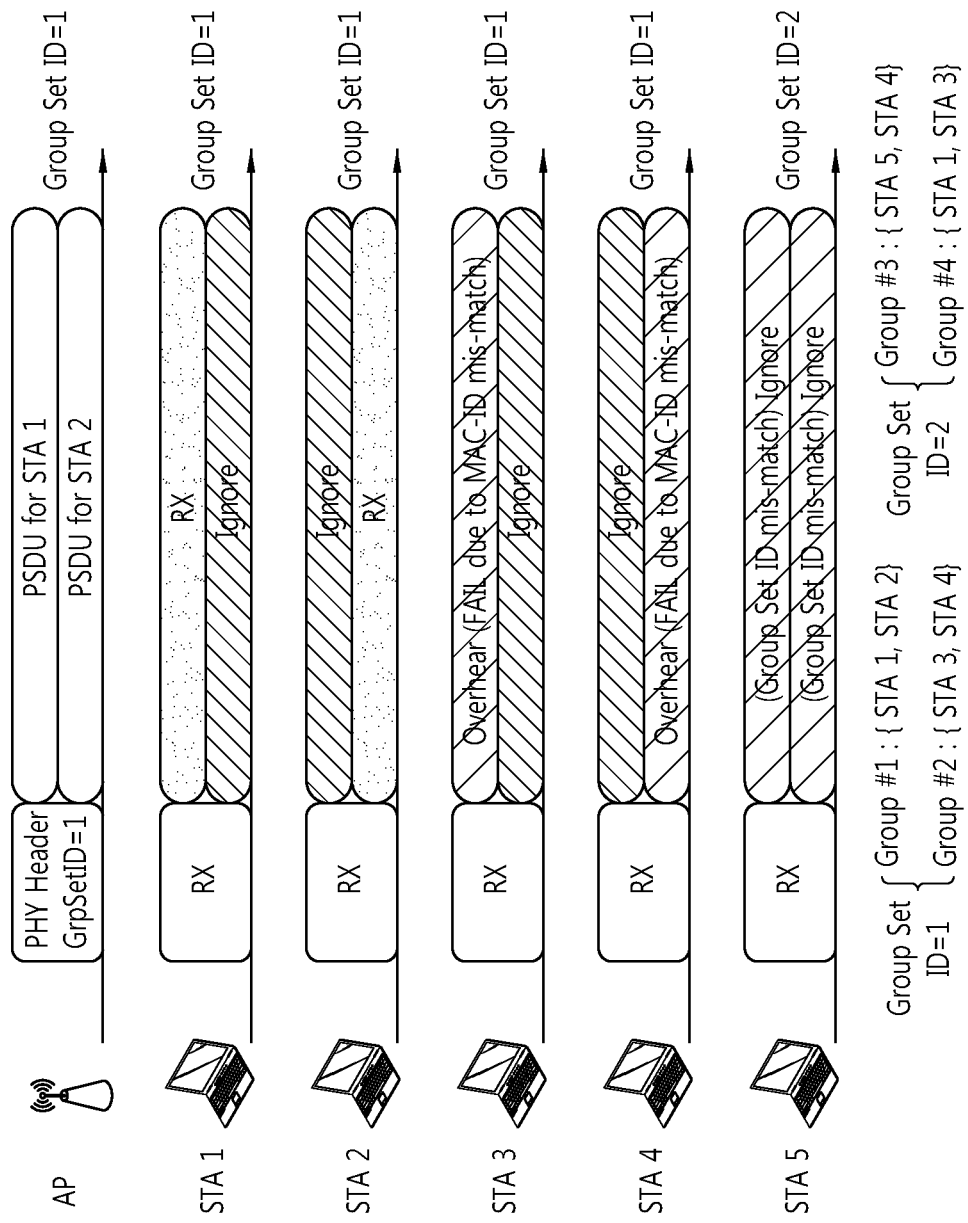
FIG. 13 is one example of frame transmission by using Group Set indication signaled in the PHY layer and Group indication signaled in the MAC layer.

FIG. 13 is one example of frame transmission by using Group Set indication signaled in the PHY layer and Group indication signaled in the MAC layer.

There are Set ID 1 and 2; two groups are defined for each Set ID; and a set of STAs is defined for each group as shown in FIG. 13. If the Set ID 1 is indicated by the VHT-SIG, all the STAs corresponding to Set ID=1 attempt decoding; eventually, the STAs belonging to each group succeeds in decoding a set of the corresponding spatial streams and based on the MAC ID, transmits the data packets to an upper layer.

In other words, the present embodiment is similar to a method of increasing the number of STAs that can be supported in the MU-MIMO transmission by associating the group identity with multiple sets of STAs rather than associating the group identity mentioned above with one set of particular STAs. However, the present invention operates a group of STAs in the PHY and MAC layer to reduce sounding and the complexity in the various MAC protocols.

FIG. 14 illustrates a format of the management information included in the management frame according to an embodiment of the present invention. To transmit data packets by using Group Set indication signaled in the PHY layer and Group indication signaled in the MAC layer, the management information of FIG. 14 can be transmitted through data packets that can be signaled to the management frame or the STAs. In the example of FIG. 14, the Group Set ID corresponds to the identifier of groups managed in the PHY layer, while the Group ID a set of particular STAs managed in the MAC layer.

It should be noted that if the Group Set identity is managed in the PHY layer and groups are managed in the MAC layer, the MU-MIMO transmission can be implemented with little overhead in terms of the sounding protocol that carries out CSI feedback.

For example, if the AP attempts CSI feedback (sounding) only for the STAs belonging to a particular group, only the STAs associated with the corresponding group are allowed for the CSI feedback (sounding) by signaling the Group ID defined in the MAC layer.

Figure 15:
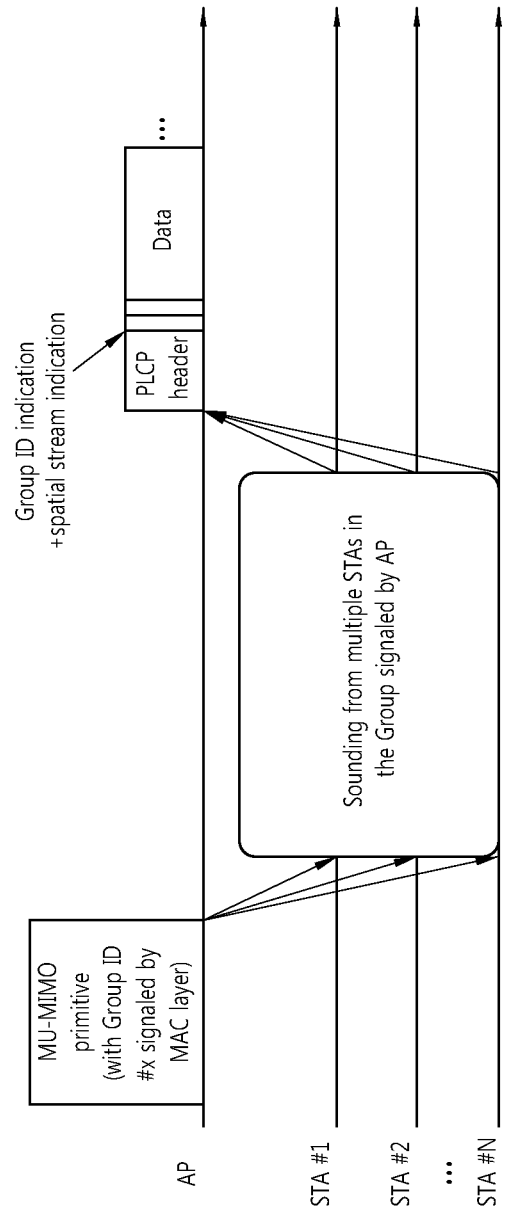
FIG. 15 is an example where a method of indicating a group by using MAC layer and PHY layer is applied to data packet transmission.

FIG. 15 is an example where a method of indicating a group by using MAC layer and PHY layer is applied to data packet transmission.

As one embodiment, the present invention manages the Group Set identifier transmitted from the PHY layer by using 4 bits, while the Group identifier is managed by using 8 bits to deal with a lot more actual groups in the MAC layer. The 8 bit Group identifier in the MAC layer can support a maximum of 256 sets of STAs, giving the AP the flexibility of scheduling approximately 10 STAs without restriction.

In a method of indicating a particular group in the MAC layer when a plurality of groups are operated after being associated with particular group sets, the control information can be transmitted to the VHT-SIG of the PLCP header part to be transmitted. At this time, the VHT-SIG can be transmitted while being divided into VHT-SIG-A and VHT-SIG-B. The Group Set information is transmitted first through the VHT-SIG-A and indicates the sets of terminals to perform decoding; and the VHT-SIG-B indicates a particular group such that which terminal should receive the corresponding spatial stream. The VHT-SIG-B can indicate exactly which STAs should receive the MU-MIMO transmission and indicate the order number of a group among the Group Set. In addition, the VHT-SIG-B transmitted separately for each individual STA can indicate the corresponding STA exactly by transmitting an ID with which an STA can be identified. At this time, the ID for identifying an STA can correspond to the Association ID.

Figure 16:
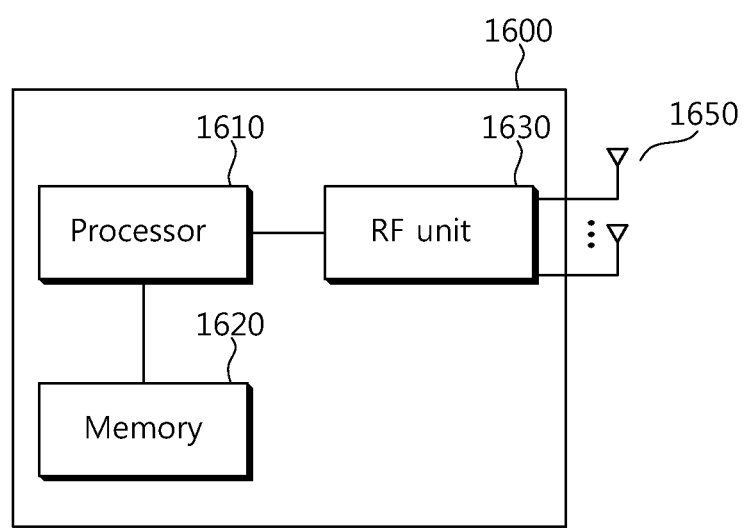
FIG. 16 is a block diagram illustrating a transmitter in which one embodiment of the present invention is implemented.

FIG. 16 is a block diagram illustrating a transmitter in which one embodiment of the present invention is implemented. The transmitter 1600 can be an AP or a non-AP STA.

The transmitter 1600 comprises a processor 1610, a memory 1620, a radio frequency (RF) unit 1630, and a multiple antenna 1650. The RF unit 1630 is configured to transmit the management frame of the present invention and data packets, the processor 1610, connected to the RF unit 1630, is configured to generate and process the management frame and data packets. The processor 1610 and the RF unit 1630 implements the physical layer and the MAC layer of IEEE 802.11 specifications. The processor 1610 and/or the RF unit 1630 may include ASIC (Application-Specific Integrated Circuit), other chipset, a logic circuit and/or data processing apparatus. The memory 1620 may include ROM (Read-Only Memory), RAM (Random Access Memory), flash memory, a memory card, a storage medium, and/or other storage device. If an embodiment is implemented by software, the technique described above can be implemented as a module (a process, a function, and so on) performing the aforementioned function. The module can be stored in the memory 1620 and can be executed by the processor 1610. The memory 1620 can be positioned inside or outside of the processor 1610; and can be connected to the processor 1610 through various well-known means.

In a wireless LAN system supporting MU-MIMO transmission, the present invention can efficiently indicate the destination STA of the MU-MIMO transmission and the spatial stream to be received, by the destination STA, by using transmission of little amount of information.

The embodiments described above include various types of examples. Though it may not be possible to describe all the possible combinations for illustrating the various types, those skilled in the art would understand that other combinations are possible. Therefore, it should be understood that the present invention includes all the other substitutions, modifications, and changes belonging to the scope as defined by the appended claims.

What is claimed is:

1. A method used in a wireless local area network, the method performed by a receiving station and comprising;
  receiving a Very High Throughput (VHT) physical layer protocol data unit (PPDU) including a group identity (ID) field, a spatial stream (SS) field and a data field,
  wherein the group ID field and the SS field are included in a VHT signal (SIG) field of the VHT PPDU,
  wherein the SS field includes information on a total number of SSs used by the receiving station,
  wherein the group ID field has a length of M bits representing $2^M$ different states, each of the $2^M$ different states including information for either a single user-multiple input multiple output (SU-MIMO) scheme used for the VHT PPDU or a group ID for a group to which the receiving station belongs, and
  wherein only one state of the $2^M$ different states is used for the VHT PPDU being received from an access point (AP) based on the SU-MIMO scheme; and
  decoding the data field based on the SS field.

2. The method of claim 1, wherein the VHT SIG field belongs to a physical layer preamble of the VHT PPDU.

3. The method of claim 1, wherein the receiving station is a non-AP station.

4. A receiving station for receiving a data packet in a wireless local area network, the receiving station comprising;
  a transceiver configured to transmit and receive radio signals; and
  a processor operably coupled to the transceiver and configured to:
    control the transceiver to receive a Very High Throughput (VHT) physical layer protocol data unit (PPDU) including a group identity (ID) field, a spatial stream (SS) field and a data field,
    wherein the group ID field and the SS field are included in a VHT signal (SIG) field of the VHT PPDU,
    wherein the SS field includes information on a total number of SSs used by the receiving station,
    wherein the group ID field has a length of M bits representing $2^M$ different states, each of the $2^M$ different states including information for either a single user-multiple input multiple output (SU-MIMO) scheme used for the VHT PPDU or a group ID for a group to which the receiving station belongs, and
    wherein only one state of the $2^M$ different states is used for the VHT PPDU being received from an access point (AP) based on the SU-MIMO scheme; and
    decode the data field based on the at least one SS field.

5. The receiving station of claim 4, wherein the VHT SIG field belongs to a physical layer preamble of the VHT PPDU.

6. The receiving station of claim 4, wherein the receiving station is a non-AP station.

* * * * *